United States Patent
Wang et al.

(10) Patent No.: US 12,279,317 B2
(45) Date of Patent: Apr. 15, 2025

(54) RANDOM ACCESS PREAMBLE TRANSMISSION METHOD, APPARATUS, AND STORAGE MEDIUM

(71) Applicant: HUAWEI TECHNOLOGIES CO., LTD., Guangdong (CN)

(72) Inventors: Xiaolu Wang, Hangzhou (CN); Hejia Luo, Hangzhou (CN); Jianwei Zhou, Hangzhou (CN); Chenlei Xu, Hangzhou (CN); Bin Wang, Hangzhou (CN); Rong Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 386 days.

(21) Appl. No.: 17/832,880

(22) Filed: Jun. 6, 2022

(65) Prior Publication Data
US 2022/0330350 A1  Oct. 13, 2022

Related U.S. Application Data

(63) Continuation of application No. PCT/CN2020/128082, filed on Nov. 11, 2020.

(30) Foreign Application Priority Data

Dec. 6, 2019 (CN) .......................... 201911243346.3

(51) Int. Cl.
*H04W 74/0833* (2024.01)
*H04B 7/01* (2006.01)
(Continued)

(52) U.S. Cl.
CPC .......... *H04W 74/0841* (2013.01); *H04B 7/01* (2013.01); *H04W 72/0446* (2013.01);
(Continued)

(58) Field of Classification Search
CPC ......... H04W 74/0841; H04W 72/0446; H04W 72/0453; H04W 74/0866; H04W 84/06;
(Continued)

(56) References Cited

U.S. PATENT DOCUMENTS 6,535,547 B1   3/2003  Lyckegård et al.
10,955,563 B2*  3/2021  Haley .................. H04W 4/029
(Continued)

FOREIGN PATENT DOCUMENTS

CN   107395267 A   11/2017
CN   109831795 A    5/2019
(Continued)

OTHER PUBLICATIONS

Office Action in Chinese Appln. No. 201911243346.3, dated May 20, 2022, 9 pages.
(Continued)

*Primary Examiner* — Nizam U Ahmed
(74) *Attorney, Agent, or Firm* — Fish & Richardson P.C.

(57) ABSTRACT

The present disclosure relates to random access preamble transmission methods, apparatuses, and storage mediums. In one example method, a terminal device determines, based on a target sub-coverage area to which the terminal device belongs in a preset coverage area of a network device, target random access preamble format information corresponding to the target sub-coverage area. Then, the terminal device sends, to the network device on a target time-frequency resource indicated by target random access preamble time-frequency resource information corresponding to the target random access preamble format information, a random access preamble corresponding to the target random access preamble format information.

18 Claims, 12 Drawing Sheets

(51) Int. Cl.
*H04W 72/0446* (2023.01)
*H04W 72/0453* (2023.01)
*H04W 74/08* (2024.01)
*H04W 84/06* (2009.01)

(52) U.S. Cl.
CPC ... *H04W 72/0453* (2013.01); *H04W 74/0866* (2013.01); *H04W 84/06* (2013.01)

(58) Field of Classification Search
CPC .... H04W 74/0833; H04W 72/23; H04B 7/01; H04L 5/0053; H04L 5/0023; H04L 5/0048

See application file for complete search history.

(56) References Cited

U.S. PATENT DOCUMENTS

| | | |
|---|---|---|
| 2009/0207762 A1 | 8/2009 | Jalloul et al. |
| 2012/0314588 A1 | 12/2012 | Nammi |
| 2014/0010214 A1 | 1/2014 | Hooli et al. |
| 2019/0053286 A1 | 2/2019 | Cho et al. |
| 2021/0083917 A1* | 3/2021 | Konishi ............. H04L 27/2675 |
| 2021/0099986 A1* | 4/2021 | Lu ........................ H04L 5/0091 |
| 2022/0272762 A1* | 8/2022 | Määttänen ......... H04B 7/18504 |

FOREIGN PATENT DOCUMENTS

| | | |
|---|---|---|
| CN | 110248366 A | 9/2019 |
| CN | 110505700 A | 11/2019 |

OTHER PUBLICATIONS

Extended European Search Report in European Appln No. 20895523.7, dated Nov. 15, 2022, 6 pages.

International Search Report and Written Opinion in International Appln. No. PCT/CN2020/128082, mailed on Feb. 18, 2021, 15 pages (with English translation).

* cited by examiner

RANDOM ACCESS PREAMBLE TRANSMISSION METHOD, APPARATUS, AND STORAGE MEDIUM

CROSS-REFERENCE TO RELATED APPLICATIONS

This application is a continuation of International Patent Application No. PCT/CN2020/128082, filed on Nov. 11, 2020, which claims priority to Chinese Patent Application No. 201911243346.3, filed on Dec. 6, 2019. The disclosures of the aforementioned applications are hereby incorporated by reference in their entireties.

TECHNICAL FIELD

This application relates to the field of communication technologies, and in particular, to a random access preamble transmission method, an apparatus, and a storage medium.

BACKGROUND

In a communication system, a terminal device generally accesses a network in a contention-based random access manner.

In a related technology, a network device broadcasts random access preamble configuration information per cell. The configuration information includes random access preamble format information and random access preamble time-frequency resource information. Further, the terminal device sends, on a time-frequency resource corresponding to the random access preamble time-frequency resource information based on the received configuration information, a random access preamble corresponding to the random access preamble format information. In the related technology, lengths of random access preambles sent by terminal devices located in a same cell are the same.

It may be learned that a length of a random access preamble sent by a terminal device close to the network device is the same as a length of a random access preamble sent by a terminal device far away from the network device. Consequently, time-frequency resources are wasted.

SUMMARY

Embodiments of this application provide a random access preamble transmission method, an apparatus, and a storage medium, to improve utilization of time-frequency resources.

According to a first aspect, an embodiment of this application provides a random access preamble transmission method, including:

determining, based on a target sub-coverage area to which a terminal device belongs in a preset coverage area of a network device, target random access preamble format information corresponding to the target sub-coverage area, where the preset coverage area includes one or more beams, and the preset coverage area includes at least two sub-coverage areas; and sending, to the network device on a target time-frequency resource corresponding to target random access preamble time-frequency resource information, a random access preamble corresponding to the target random access preamble format information, where the target random access preamble time-frequency resource information is random access preamble time-frequency resource information corresponding to the target random access preamble format information.

In this embodiment of this application, the terminal device determines, from at least two pieces of random access preamble format information based on the target sub-coverage area to which the terminal device belongs in the preset coverage area of the network device, the target random access preamble format information corresponding to the target sub-coverage area, where the at least two pieces of random access preamble format information are sent by the network device. Then, the terminal device sends, to the network device on the target time-frequency resource indicated by the target random access preamble time-frequency resource information corresponding to the target random access preamble format information, the random access preamble corresponding to the target random access preamble format information. It may be learned that, in this embodiment of this application, any terminal device may send a random access preamble based on a target sub-coverage area to which the terminal device belongs in the preset coverage area of the network device and by using random access preamble format information corresponding to the target sub-coverage area. In this way, a length of a random access preamble sent by a terminal device closer to the network device is shorter, and a length of a random access preamble sent by a terminal device farther away from the network device is longer, so that time-frequency resources used to transmit the random access preamble can be saved.

In a possible implementation, the target sub-coverage area is associated with Doppler information of a location of the terminal device and obtained Doppler reference information, and the at least two sub-coverage areas are obtained through division based on the Doppler reference information.

In a possible implementation, the Doppler reference information includes: at least one Doppler threshold, where different Doppler thresholds correspond to different sub-coverage areas, and/or at least one Doppler change rate threshold, where different Doppler change rate thresholds correspond to different sub-coverage areas.

In a possible implementation, if the Doppler reference information includes at least one Doppler threshold, the Doppler information correspondingly includes a Doppler value, and/or if the Doppler reference information includes the at least one Doppler change rate threshold, the Doppler information correspondingly includes a Doppler change rate value.

In a possible implementation, before the determining, based on a target sub-coverage area to which a terminal device belongs in a preset coverage area of a network device, target random access preamble format information corresponding to the target sub-coverage area, the method further includes:

receiving the Doppler reference information sent by the network device.

In a possible implementation, before the determining, based on a target sub-coverage area to which a terminal device belongs in a preset coverage area of a network device, target random access preamble format information corresponding to the target sub-coverage area, the method further includes:

determining the Doppler information based on a downlink signal sent by the network device.

In a possible implementation, the determining, based on a target sub-coverage area to which a terminal device belongs in a preset coverage area of a network device, target random access preamble format information corresponding to the target sub-coverage area includes:

determining, from obtained at least two pieces of random access preamble format information based on mapping information between a preset sub-coverage area and random access preamble format information, the target random access preamble format information corresponding to the target sub-coverage area, where the mapping information between a preset sub-coverage area and random access preamble format information includes mapping information between the target sub-coverage area and the target random access preamble format information.

It should be understood that the mapping information between a preset sub-coverage area and random access preamble format information on the terminal device may be preset by a system or the network device. Certainly, the mapping information between a preset sub-coverage area and random access preamble format information may be obtained in another manner. This is not limited in this embodiment of this application.

In a possible implementation, before the determining, based on a target sub-coverage area to which a terminal device belongs in a preset coverage area of a network device, target random access preamble format information corresponding to the target sub-coverage area, the method further includes:

receiving random access preamble configuration information sent by the network device, where the random access preamble configuration information includes the at least two pieces of random access preamble format information and random access preamble time-frequency resource information corresponding to the random access preamble format information.

In a possible implementation, random access preamble format information corresponding to different sub-coverage areas is different, and a length of a random access preamble indicated by random access preamble format information corresponding to any sub-coverage area is in a positive relationship with a distance between the sub-coverage area and the network device, or a longer distance between any sub-coverage area and the network device indicates a longer length of a random access preamble indicated by random access preamble format information corresponding to the sub-coverage area.

In a possible implementation, the target random access preamble format information includes at least one of the following: a length of a cyclic prefix CP, a sequence length, a quantity of repetition times of a sequence, and a subcarrier spacing of the random access preamble.

According to a second aspect, an embodiment of this application provides a random access preamble transmission method, including:

sending random access preamble configuration information and Doppler reference information, where the random access preamble configuration information includes at least two pieces of random access preamble format information and random access preamble time-frequency resource information corresponding to the random access preamble format information, the Doppler reference information is used to indicate to divide a preset coverage area of a network device into at least two sub-coverage areas, and the preset coverage area includes one or more beams; and receiving a random access preamble sent by a terminal device on a target time-frequency resource, where target random access preamble format information corresponding to the random access preamble is one piece of random access preamble format information in the at least two pieces of random access preamble format information, the target random access preamble format information is associated with a target sub-coverage area to which the terminal device belongs in the at least two sub-coverage areas, and target random access preamble time-frequency resource information corresponding to the target time-frequency resource is random access preamble time-frequency resource information that corresponds to the target random access preamble format information and that is in the at least two pieces of random access preamble time-frequency resource information.

In this embodiment of this application, the network device sends the random access preamble configuration information and the Doppler reference information to the terminal device. In this way, after receiving the random access preamble configuration information and the Doppler reference information, the terminal device may determine, based on the Doppler reference information, the target sub-coverage area to which the terminal device belongs in the preset coverage area of the network device, and determine, from the at least two pieces of random access preamble format information in the random access preamble configuration information, the target random access preamble format information corresponding to the target sub-coverage area. Further, the network device receives the random access preamble that corresponds to the target random access preamble format information and that is sent by the terminal device on the target time-frequency resource indicated by the target random access preamble time-frequency resource information corresponding to the target random access preamble format information. It may be learned that, in this embodiment of this application, the network device may receive a random access preamble sent by any terminal device based on a target sub-coverage area to which the terminal device belongs in the preset coverage area of the network device and by using random access preamble format information corresponding to the target sub-coverage area. In this way, a length of a random access preamble sent by a terminal device closer to the network device is shorter, and a length of a random access preamble sent by a terminal device farther away from the network device is longer, so that time-frequency resources used to transmit the random access preamble can be saved.

In a possible implementation, the target sub-coverage area is associated with Doppler information of a location of the terminal device and the Doppler reference information.

In a possible implementation, the Doppler reference information includes: at least one Doppler threshold, where different Doppler thresholds correspond to different sub-coverage areas, and/or at least one Doppler change rate threshold, where different Doppler change rate thresholds correspond to different sub-coverage areas.

In a possible implementation, if the Doppler reference information includes at least one Doppler threshold, the Doppler information correspondingly includes a Doppler value; and/or if the Doppler reference information includes the at least one Doppler change rate threshold, the Doppler information correspondingly includes a Doppler change rate value.

In a possible implementation, random access preamble format information corresponding to different sub-coverage areas is different, and a length of a random access preamble indicated by random access preamble format information corresponding to any sub-coverage area is in a positive relationship with a distance between the sub-coverage area and the network device.

In a possible implementation, the target random access preamble format information includes at least one of the following: a length of a cyclic prefix CP, a sequence length, a quantity of repetition times of a sequence, and a subcarrier spacing of the random access preamble.

According to a third aspect, an embodiment of this application provides a terminal device, including:

a processing module, configured to determine, based on a target sub-coverage area to which the terminal device belongs in a preset coverage area of a network device, target random access preamble format information corresponding to the target sub-coverage area, where the preset coverage area includes one or more beams, and the preset coverage area includes at least two sub-coverage areas; and a sending module, configured to send, to the network device on a target time-frequency resource corresponding to target random access preamble time-frequency resource information, a random access preamble corresponding to the target random access preamble format information, where the target random access preamble time-frequency resource information is random access preamble time-frequency resource information corresponding to the target random access preamble format information.

In a possible implementation, the target sub-coverage area is associated with Doppler information of a location of the terminal device and obtained Doppler reference information, and the at least two sub-coverage areas are obtained through division based on the Doppler reference information.

In a possible implementation, the Doppler reference information includes: at least one Doppler threshold, where different Doppler thresholds correspond to different sub-coverage areas, and/or at least one Doppler change rate threshold, where different Doppler change rate thresholds correspond to different sub-coverage areas.

In a possible implementation, if the Doppler reference information includes at least one Doppler threshold, the Doppler information correspondingly includes a Doppler value; and/or if the Doppler reference information includes the at least one Doppler change rate threshold, the Doppler information correspondingly includes a Doppler change rate value.

In a possible implementation, the terminal device further includes:

a receiving module, configured to receive the Doppler reference information sent by the network device.

In a possible implementation, the processing module is further configured to:

determine the Doppler information based on a downlink signal sent by the network device.

In a possible implementation, the processing module is specifically configured to:

determine, from obtained at least two pieces of random access preamble format information based on mapping information between a preset sub-coverage area and random access preamble format information, the target random access preamble format information corresponding to the target sub-coverage area, w % here the mapping information between a preset sub-coverage area and random access preamble format information includes mapping information between the target sub-coverage area and the target random access preamble format information.

In a possible implementation, the terminal device further includes:

the receiving module, configured to receive random access preamble configuration information sent by the network device, where the random access preamble configuration information includes the at least two pieces of random access preamble format information and random access preamble time-frequency resource information corresponding to the random access preamble format information.

In a possible implementation, random access preamble format information corresponding to different sub-coverage areas is different, and a length of a random access preamble indicated by random access preamble format information corresponding to any sub-coverage area is in a positive relationship with a distance between the sub-coverage area and the network device.

In a possible implementation, the target random access preamble format information includes at least one of the following: a length of a cyclic prefix CP, a sequence length, a quantity of repetition times of a sequence, and a subcarrier spacing of the random access preamble.

According to a fourth aspect, an embodiment of this application provides a network device, including:

a sending module, configured to send random access preamble configuration information and Doppler reference information, where the random access preamble configuration information includes at least two pieces of random access preamble format information and random access preamble time-frequency resource information corresponding to the random access preamble format information, the Doppler reference information is used to indicate to divide a preset coverage area of the network device into at least two sub-coverage areas, and the preset coverage area includes one or more beams; and a receiving module, configured to receive a random access preamble sent by a terminal device on a target time-frequency resource, where target random access preamble format information corresponding to the random access preamble is one piece of random access preamble format information in the at least two pieces of random access preamble format information, the target random access preamble format information is associated with a target sub-coverage area to which the terminal device belongs in the at least two sub-coverage areas, and target random access preamble time-frequency resource information corresponding to the target time-frequency resource is random access preamble time-frequency resource information that corresponds to the target random access preamble format information and that is in the at least two pieces of random access preamble time-frequency resource information.

In a possible implementation, the target sub-coverage area is associated with Doppler information of a location of the terminal device and the Doppler reference information.

In a possible implementation, the Doppler reference information includes: at least one Doppler threshold, where different Doppler thresholds correspond to different sub-coverage areas, and/or at least one Doppler change rate threshold, where different Doppler change rate thresholds correspond to different sub-coverage areas.

In a possible implementation, if the Doppler reference information includes at least one Doppler threshold, the Doppler information correspondingly includes a Doppler value; and/or if the Doppler reference information includes the at least one Doppler change rate threshold, the Doppler information correspondingly includes a Doppler change rate value.

In a possible implementation, random access preamble format information corresponding to different sub-coverage areas is different, and a length of a random access preamble indicated by random access preamble format information corresponding to any sub-coverage area is in a positive relationship with a distance between the sub-coverage area and the network device.

In a possible implementation, the target random access preamble format information includes at least one of the following: a length of a cyclic prefix CP, a sequence length, a quantity of repetition times of a sequence, and a subcarrier spacing of the random access preamble.

According to a fifth aspect, an embodiment of this application provides a communication apparatus, including a processor and a communication interface, where the communication interface is configured to: receive to-be-processed data, and output processed data, and the processor is configured to perform, for the to-be-processed data, the method according to any one of the first aspect or the implementations of the first aspect, to obtain the processed data.

In a possible implementation, the communication apparatus further includes a memory, configured to store program instructions, and when the program instructions are executed by the processor, the method according to any one of the first aspect or the implementations of the first aspect is performed.

According to a sixth aspect, an embodiment of this application provides a communication apparatus, including a logic circuit, an input interface, and an output interface, where the input interface is configured to obtain to-be-processed data;

the logic circuit is configured to perform, for the to-be-processed data, the method according to any one of the first aspect or the implementations of the first aspect, to obtain processed data; and the output interface is configured to output the processed data.

According to a seventh aspect, an embodiment of this application provides a chip, including the communication apparatus according to any one of the implementations of the fifth aspect or the sixth aspect.

According to an eighth aspect, an embodiment of this application provides a computer-readable storage medium, where the computer-readable storage medium is configured to store a computer program, and the computer program is used to implement the method according to any one of the first aspect or the implementations of the first aspect.

According to a ninth aspect, an embodiment of this application provides a communication apparatus, including a processor and a communication interface, w % here the communication interface is configured to: receive to-be-processed data, and output processed data, and the processor is configured to perform, for the to-be-processed data, the method according to any one of the second aspect or the implementations of the second aspect, to obtain the processed data.

In a possible implementation, the communication apparatus further includes a memory, configured to store program instructions, and when the program instructions are executed by the processor, the method according to any one of the second aspect or the implementations of the second aspect is performed.

According to a tenth aspect, an embodiment of this application provides a communication apparatus, including a logic circuit, an input interface, and an output interface, where the input interface is configured to obtain to-be-processed data;

the logic circuit is configured to perform, for the to-be-processed data, the method according to any one of the second aspect or the implementations of the second aspect, to obtain processed data; and the output interface is configured to output the processed data.

According to an eleventh aspect, an embodiment of this application provides a chip, including the communication apparatus according to any one of the implementations of the ninth aspect or the tenth aspect.

According to a twelfth aspect, an embodiment of this application provides a computer-readable storage medium, where the computer-readable storage medium is configured to store a computer program, and the computer program is used to implement the method according to any one of the second aspect or the implementations of the second aspect.

DESCRIPTION OF EMBODIMENTS

First, communication scenarios and some terms used in embodiments of this application are described.

A random access preamble transmission method, an apparatus, and a storage medium provided in embodiments of this application may be applied to a terrestrial communication scenario, or may be applied to a non-terrestrial network (NTN) communication scenario. Certainly, the random access preamble transmission method, the apparatus, and the storage medium may be applied to another communication scenario. This is not limited in embodiments of this application.

Figure 1:
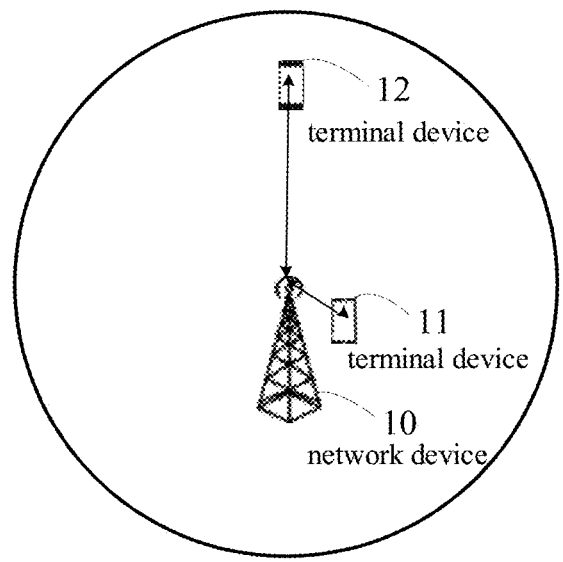
FIG. 1 is a schematic diagram of a communication system in a terrestrial communication scenario according to an embodiment of this application.

FIG. 1 is a schematic diagram of a communication system in a terrestrial communication scenario according to an embodiment of this application. As shown in FIG. 1, the communication system in the terrestrial communication scenario may include but is not limited to a network device 10 and at least one terminal device (for ease of drawing, a terminal device 11 and a terminal device 12 are shown as an example in FIG. 1). A distance between the terminal device 11 and the network device 10 is less than a distance between the terminal device 12 and the network device 10.

Certainly, the communication system in the terrestrial communication scenario may include another device. This is not limited in this embodiment of this application.

For example, the communication system in the terrestrial communication scenario may be a base station access system (that is, the RAN includes a base station and a base station controller) in a 2G network, a base station access system (that is, the RAN includes a base station and an RNC) in a 3G network, a base station access system (that is, the RAN includes an eNB and an RNC) in a 4G network, a base station access system in a fifth generation mobile communication technology (5th-generation, 5G) network, or a base station access system in a future network.

For example, in the terrestrial communication scenario, the network device 10 may include but is not limited to a base station and a transmission reception point (TRP). The base station is also referred to as a radio access network (RAN) device, and is a device that connects a terminal (or referred to as a terminal device) to a wireless network. The base station may be a base transceiver station (BTS) in a global system for mobile communication (GSM) or code division multiple access (CDMA), or may be a NodeB (NB) in wideband code division multiple access (WCDMA), or may be an evolved NodeB (eNB or eNodeB) in long term evolution (LTE), a relay node or an access point, a gNodeB (gNB) in a 5G network, a base station in a future network, or the like. This is not limited herein.

The terminal device 11 and/or the terminal device 12 may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). For another example, the wireless terminal is a wearable device, a computing device, another processing device connected to a wireless modem, a mobile phone, a tablet computer, a notebook computer, a palmtop computer, a mobile internet device (MID), a machine type communication terminal, a virtual reality (VR) device, an augmented reality (AR) device, a wireless terminal in industrial control, a wireless terminal in self driving, a wireless terminal in a remote medical surgery, a wireless terminal in a smart grid, a wireless terminal in transportation safety, a wireless terminal in a smart city, or a wireless terminal in a smart home.

The wireless terminal may also be referred to as a system, a subscriber unit, a subscriber station, a mobile station, a mobile, a remote station, a remote terminal, an access terminal, a user terminal, a user agent, or a user device or user equipment (UE). This is not limited herein.

Figure 2:
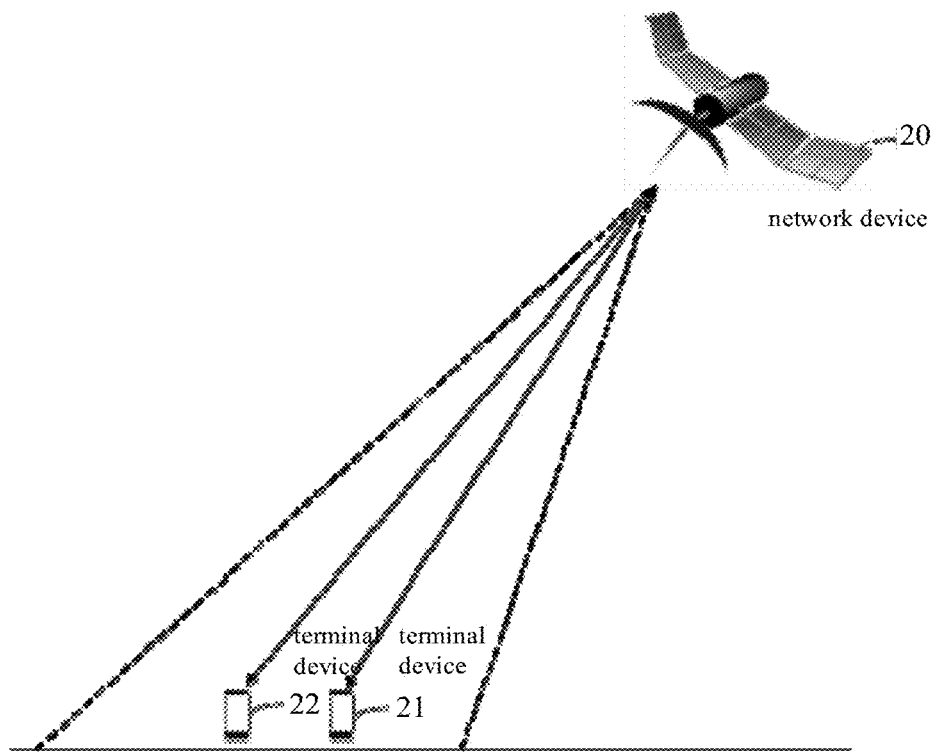
FIG. 2 is a schematic diagram of a communication system in an NTN communication scenario according to an embodiment of this application.

FIG. 2 is a schematic diagram of a communication system in an NTN communication scenario according to an embodiment of this application. As shown in FIG. 2, the communication system in the NTN communication scenario may include but is not limited to a network device 20 and at least one terminal device (for ease of drawing, a terminal device 21 and a terminal device 22 are shown as an example in FIG. 2). A distance between the terminal device 21 and the network device 20 is less than a distance between the terminal device 22 and the network device 20.

Certainly, the communication system in the NTN communication scenario may include another device. This is not limited in this embodiment of this application.

For example, the communication system in the NTN communication scenario may include but is not limited to a mobile satellite communication system in satellite communication.

For example, in the NTN communication scenario, the network device 20 may include but is not limited to a satellite device, for example, a low earth orbit (LEO) satellite device, a device that has a wireless receiving/sending function in an LEO satellite device, a chip that is in an LEO satellite device and that is disposed in a device having a wireless receiving/sending function, a non-geostationary earth orbit (NGEO) communication satellite device, a device that has a wireless receiving/sending function in an NGEO communication satellite device, or a chip that is in an NGEO communication satellite device and that is disposed in a device having a wireless receiving/sending function.

The terminal device 21 and/or the terminal device 22 may include but are not limited to the mobile terminal, the relay node, or the base station in the terrestrial communication scenario. For example, the satellite device may provide a communication service for the terminal device 21 and the terminal device 22, and the terminal device 21 and the terminal device 22 each serve as a relay node to provide the communication service to another device connected to each of the terminal device 21 and the terminal device 22.

It should be noted that the network device in this embodiment of this application may further include a device that has a network function in device-to-device (D2D) communication. Correspondingly, the terminal device may further include a device that has a receiving function in D2D communication.

In embodiments of this application, a method on a network device side may be performed by any one of the network devices, or may be performed by an apparatus in any one of the network devices (it should be noted that the network device is used as an example for description in the embodiments provided in this application). For example, the apparatus in the network device may be a chip system, a circuit, a module, or the like. This is not limited in this application.

In embodiments of this application, a method on a terminal device side may be performed by any one of the terminal devices, or may be performed by an apparatus in any one of the terminal devices (it should be noted that the terminal device is used as an example for description in the embodiments provided in this application). For example, the apparatus in the terminal device may be a chip system, a circuit, a module, or the like. This is not limited in this application.

The terminal device or the network device in this application may include a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more computer operating systems that implement service processing by using a process, for example, a Linux operating system, a Unix operating system, an Android operating system, an iOS operating system, or a windows operating system. The application layer includes applications such as a browser, an address book, word processing software, and instant messaging software.

In embodiments of this application, a random access preamble may include but is not limited to a cyclic prefix (CP), a sequence, and a guard time (GT). One of functions of the CP is to eliminate inter-symbol interference caused by a round-trip delay difference. Therefore, when the round-trip delay difference increases, a length of the CP also increases. In addition, a sequence length and a length of the GT are not shorter than the length of the CP. Therefore, if the round-trip delay difference increases, a total length of the random access preamble definitely increases.

Because a radius of a terrestrial cell in the terrestrial communication scenario is not greater than 100 km, and a round-trip delay in the terrestrial cell is small, the length of the CP of the random access preamble is less than or equal to 684.37 µs. However, in the NTN communication scenario, a diameter of each beam is large, and a round-trip delay difference in the beam is far greater than the round-trip delay in the terrestrial communication scenario. The length of the CP of the random access preamble needs to be greater than a maximum round-trip delay difference, and the sequence length and the length of the GT are not shorter than the length of the CP. Therefore, the total length of the random access preamble in the NTN communication scenario is far greater than the total length of the random access preamble in the terrestrial communication scenario. As a result, sending the random access preamble in the NTN communication scenario occupies more time-frequency resources.

LEO satellite communication is used as an example. It is assumed that an orbital height is 1200 km, a diameter of a beam is about 300 km, and a minimum elevation angle is 12 degrees. In this case, a maximum round-trip delay difference in the beam is 1.86 ms, that is, the length of the CP of the random access preamble is at least 1.86 ms. It may be learned that the length of the CP in the LEO satellite communication scenario is 2.74 times the length of the CP in the terrestrial communication scenario. A random access time domain resource allocated to the random access preamble in the LEO satellite communication scenario is at least 5.58 ms, and a random access time domain resource allocated to the random access preamble in the terrestrial communication scenario is at most 3.51 ms.

The following describes a random access process in embodiments of this application by using the terrestrial communication scenario as an example.

Figure 3:
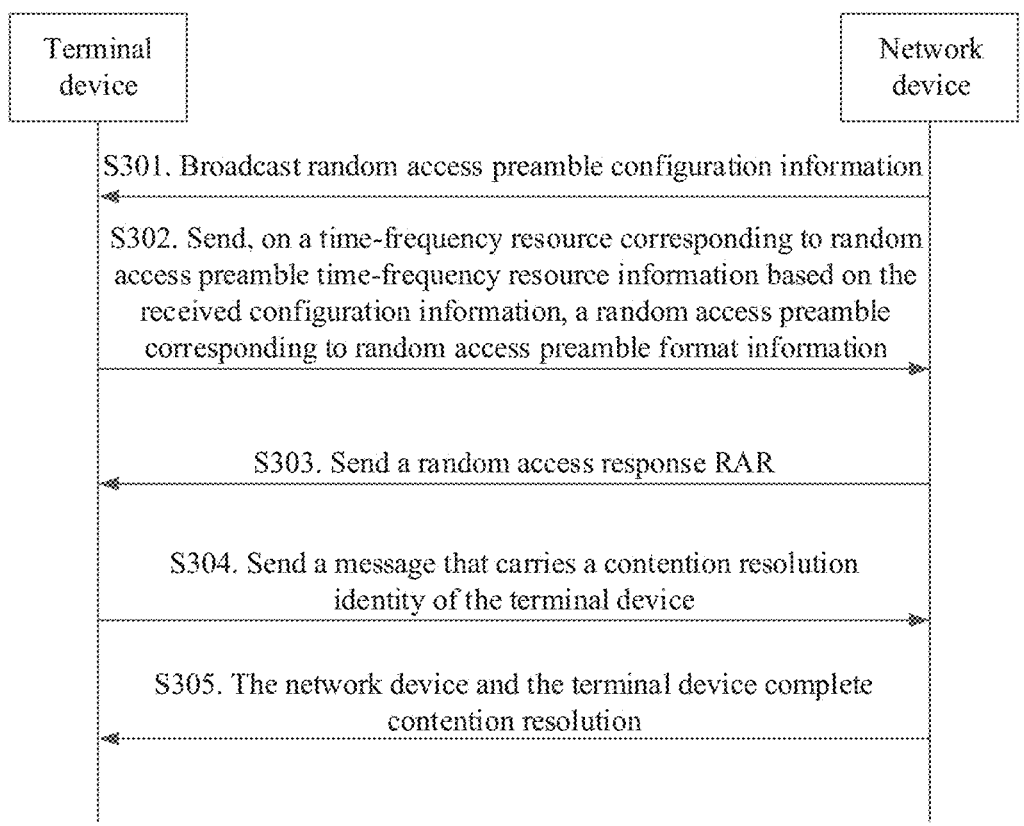
FIG. 3 is a schematic diagram of a contention-based random access process in a related technology.

In the terrestrial communication scenario, a terminal device accesses a network in a contention-based random access manner. FIG. 3 is a schematic diagram of a contention-based random access process in a related technology. As shown in FIG. 3, the contention-based random access process includes the following steps.

Step S301. A network device broadcasts random access preamble configuration information per cell, where the configuration information includes random access preamble format information and random access preamble time-frequency resource information.

Step S302. The terminal device sends, on a time-frequency resource corresponding to the random access preamble time-frequency resource information based on the received configuration information, a random access preamble corresponding to the random access preamble format information. Lengths of random access preambles sent by terminal devices located in a same cell are the same.

Step S303. After receiving the random access preamble, the network device sends a random access response (RAR) to the terminal device, where the RAR may carry a timing advance (TA) corresponding to a transmission delay estimated by detecting the preamble by the network device and the like.

Step S304. After receiving the RAR, the terminal device sends, to the network device, a message that carries a contention resolution identity of the terminal device, to resolve contention.

Step S305. The network device and the terminal device complete contention resolution.

It may be learned that, in a terrestrial communication scenario in the related technology, a length of a random access preamble sent by a terminal device (a round-trip delay is small) close to the network device is the same as a length of a random access preamble sent by a terminal device (a round-trip delay is large) far away from the network device. Consequently, time-frequency resources used to send the random access preamble are wasted.

In addition, in an NTN communication scenario, a diameter of a beam is far greater than a radius of a cell in the terrestrial communication scenario. If lengths of random access preambles sent by terminal devices in a same beam are the same, for a terminal device (a round-trip delay difference is small) close to a satellite device, time-frequency resources used to send the random access preamble are wasted.

It should be noted that the beam in this embodiment of this application is a coverage area of an electromagnetic wave transmitted by an antenna in the network device. Certainly, the beam may have another name, for example, a cell or an area corresponding to a bandwidth part (BWP).

In this embodiment of this application, a preset coverage area may include one or more beams, and the preset coverage area may include but is not limited to at least two sub-coverage areas obtained through division based on Doppler reference information.

In this embodiment of this application, the Doppler reference information may include but is not limited to: at least one Doppler threshold, where different Doppler thresholds correspond to different sub-coverage areas, and/or at least one Doppler change rate threshold, where different Doppler change rate thresholds correspond to different sub-coverage areas.

Figure 4:
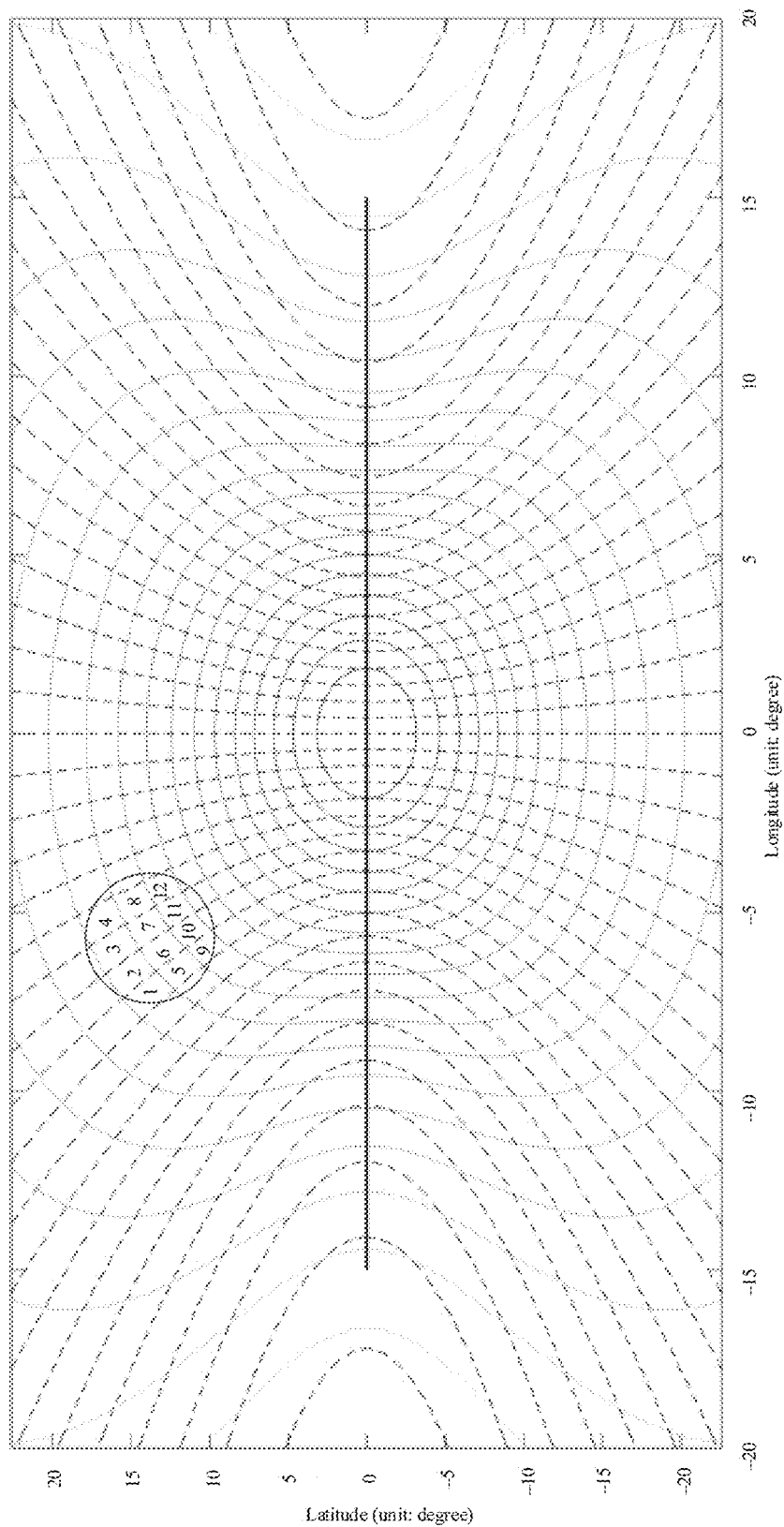
FIG. 4 is a schematic diagram of division of a coverage area of an LEO satellite device according to an embodiment of this application.

For ease of understanding, in this embodiment of this application, an LEO satellite device moving from the west to the east is used as an example to describe division of a coverage area of the LEO satellite device. FIG. 4 is a schematic diagram of division of a coverage area of an LEO satellite device according to an embodiment of this application. As shown in FIG. 4, it is assumed that the LEO satellite device is directly above longitude and latitude coordinates (0, 0), and moves from the west to the east in an equatorial direction. In FIG. 4, a dashed line indicates a contour line of a Doppler threshold in the coverage area of the LEO satellite device, a solid line indicates a contour line of a Doppler change rate threshold, and a black straight line indicates a projection of a moving track of the LEO satellite device on a surface of the earth. As shown in FIG. 4, a circle at an upper left part indicates a preset coverage area in the coverage area of the LEO satellite device. As shown in FIG. 4, the contour line of the Doppler threshold and the contour line of the Doppler change rate threshold divide the preset coverage area into 12 sub-coverage areas. Random access preamble format information corresponding to different sub-coverage areas is different, and a length of a random access preamble indicated by random access preamble format information corresponding to any sub-coverage area is in a positive relationship with a distance between the sub-coverage area and the LEO satellite device, or a longer distance between any sub-coverage area and the LEO satellite device indicates a longer length of a random access preamble indicated by random access preamble format information corresponding to the sub-coverage area. For example, a length of a random access preamble indicated by random access preamble format information corresponding to a sub-coverage area 2 shown in FIG. 4 is greater than a length of a random access preamble indicated by random access preamble format information corresponding to a sub-coverage area 6.

It should be understood that, if the contour line of the Doppler threshold is considered, and the contour line of the Doppler change rate threshold is not considered, the contour line of the Doppler threshold may divide the preset coverage area into a plurality of sub-coverage areas. Alternatively, if the contour line of the Doppler change rate threshold is considered, and the contour line of the Doppler threshold is not considered, the contour line of the Doppler change rate threshold may divide the preset coverage area into a plurality of sub-coverage areas.

Certainly, the preset coverage area may be divided into at least two sub-coverage areas in another manner.

In this embodiment of this application, Doppler information corresponds to the Doppler reference information. For example, if the Doppler reference information includes at least one Doppler threshold, the Doppler information correspondingly includes a Doppler value.

For another example, if the Doppler reference information includes at least one Doppler change rate threshold, the Doppler information correspondingly includes a Doppler change rate value.

For another example, if the Doppler reference information includes at least one Doppler threshold and at least one Doppler change rate threshold, the Doppler information correspondingly includes a Doppler value and a Doppler change rate value.

In this embodiment of this application, the Doppler value may include but is not limited to at least one of the following: a Doppler shift caused by relative motion between the network device and the terminal device, a frequency offset generated by a crystal oscillator or a local oscillator of the network device, and a frequency offset generated by a crystal oscillator or a local oscillator of the terminal device. Correspondingly, in this embodiment of this application, the Doppler change rate value may be obtained based on a change rate of the Doppler value.

In this embodiment of this application, any random access preamble format information may include but is not limited to at least one of the following: a length of a cyclic prefix CP, a sequence length, a quantity of repetition times of a sequence, and a subcarrier spacing of a random access preamble.

In this application, "at least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

According to the random access preamble transmission method, the apparatus, and the storage medium provided in embodiments of this application, the network device sends random access preamble configuration information and Doppler reference information to the terminal device. The random access preamble configuration information may include but is not limited to at least two pieces of random access preamble format information and random access preamble time-frequency resource information corresponding to each piece of random access preamble format information. The Doppler reference information is used to indicate to divide a preset coverage area of the network device into at least two sub-coverage areas. Correspondingly, the terminal device determines, based on the Doppler reference information, a target sub-coverage area to which the terminal device belongs in the preset coverage area of the network device, and determines, from the at least two pieces of random access preamble format information, target random access preamble format information corresponding to the target sub-coverage area. Then, the terminal device sends, to the network device on a target time-frequency resource indicated by target random access preamble time-frequency resource information corresponding to the target random access preamble format information, a random access preamble corresponding to the target random access preamble format information. It may be learned that any terminal device may send a random access preamble based on a target sub-coverage area to which the terminal device belongs in the preset coverage area of the network device and by using corresponding random access preamble format information. In this way, a length of a random access preamble sent by a terminal device closer to the network device is shorter, and a length of a random access preamble sent by a terminal device farther away from the network device is longer, so that the foregoing technical problem that time-frequency resources are wasted is resolved.

In this embodiment of this application, the terminal device may determine, based on the Doppler information of a location of the terminal device and the Doppler reference information obtained from the network device, the target sub-coverage area to which the terminal device belongs in the preset coverage area of the network device.

In a possible implementation, if the Doppler reference information includes at least one Doppler threshold, and the Doppler information correspondingly includes a Doppler value, the terminal device determines, based on the Doppler value of the location of the terminal device and the at least one Doppler threshold, the target sub-coverage area to which the terminal device belongs in the preset coverage area of the network device.

In another possible implementation, if the Doppler reference information includes at least one Doppler change rate threshold, and the Doppler information correspondingly includes a Doppler change rate value, the terminal device determines, based on the Doppler change rate value of the location of the terminal device and the at least one Doppler change rate threshold, the target sub-coverage area to which the terminal device belongs in the preset coverage area of the network device.

In another possible implementation, if the Doppler reference information includes at least one Doppler threshold and at least one Doppler change rate threshold, and the Doppler information correspondingly includes a Doppler value and a Doppler change rate value, the terminal device determines, based on the Doppler value and the Doppler change rate value of the location of the terminal device, the at least one Doppler threshold, and the at least one Doppler change rate threshold, the target sub-coverage area to which the terminal device belongs in the preset coverage area of the network device.

The following describes in detail the technical solutions of this application by using specific embodiments. The following specific embodiments may be combined with each other. For a same or similar concept or process, details are possibly not described again in some embodiments.

Figure 5:
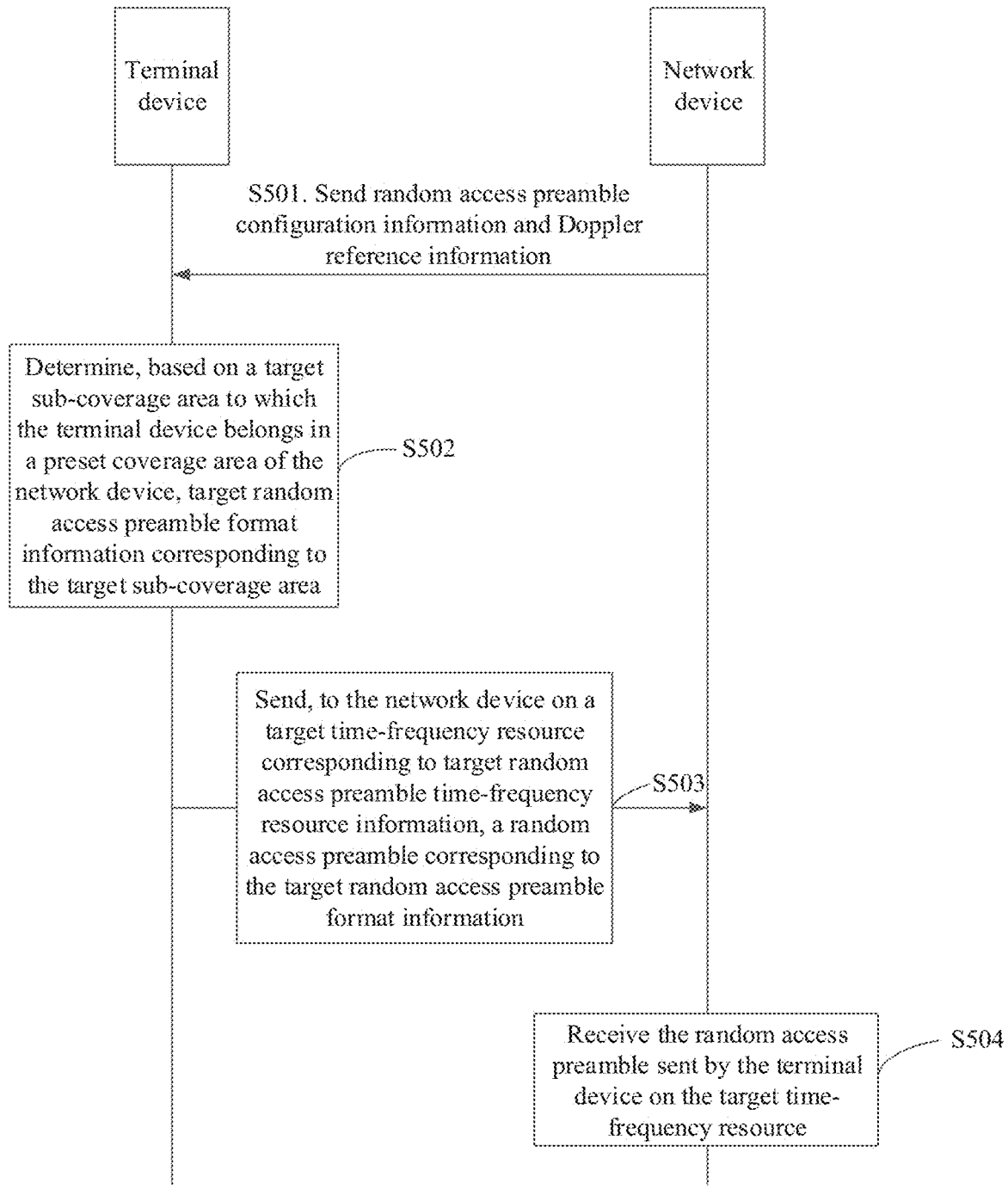
FIG. 5 is a schematic flowchart of a random access preamble transmission method according to an embodiment of this application.

FIG. 5 is a schematic flowchart of a random access preamble transmission method according to an embodiment of this application. As shown in FIG. 5, the method in this embodiment of this application may include the following steps.

Step S501. A network device sends random access preamble configuration information and Doppler reference information.

For example, the random access preamble configuration information may include but is not limited to at least two pieces of random access preamble format information and random access preamble time-frequency resource information corresponding to each piece of random access preamble format information. Lengths of random access preambles indicated by different random access preamble format information are different.

In this embodiment of this application, any random access preamble format information may include but is not limited to at least one of the following: a length of a cyclic prefix CP, a sequence length, a quantity of repetition times of a sequence, and a subcarrier spacing of a random access preamble.

It should be understood that a time-frequency resource indicated by random access preamble time-frequency resource information corresponding to any random access preamble format information is used by a terminal device to send a random access preamble indicated by the random access preamble format information.

In this step, the network device may send the random access preamble configuration information and the Doppler reference information to a terminal device located in a preset coverage area. In this way, after receiving the random access preamble configuration information and the Doppler reference information, the terminal device may determine, based on the Doppler reference information, a target sub-coverage area to which the terminal device belongs in the preset coverage area of the network device, and determine, from the at least two pieces of random access preamble format information, target random access preamble format information corresponding to the target sub-coverage area.

For example, the network device may add the random access preamble configuration information and the Doppler reference information into a system information block (SIB) for sending through broadcast. It should be understood that the random access preamble configuration information and the Doppler reference information may be carried in a same SIB or different SIBs.

Optionally, the network device may send the random access preamble configuration information to the terminal device by sending a configuration index. Correspondingly, after receiving the configuration index, the terminal device queries a preset random access preamble configuration table based on the configuration index, to obtain the random access preamble configuration information.

Similarly, the network device may send the Doppler reference information to the terminal device by sending a Doppler reference index. Correspondingly, after receiving the Doppler reference index, the terminal device queries a preset Doppler reference index table based on the Doppler reference index, to obtain the Doppler reference information.

It should be understood that the preset random access preamble configuration table and the preset Doppler reference index table may be preset by a system or the network device. Certainly, the preset random access preamble configuration table and the preset Doppler reference index table may be preset in another manner. This is not limited in this embodiment of this application.

Certainly, the network device may send the random access preamble configuration information and the Doppler reference information in another manner. This is not limited in this embodiment of this application.

For example, the Doppler reference information is used to indicate to divide the preset coverage area of the network device into at least two sub-coverage areas, and the preset coverage area includes one or more adjacent beams. Random access preamble format information corresponding to different sub-coverage areas is different, and a length of a random access preamble indicated by random access preamble format information corresponding to any sub-coverage area is in a positive relationship with a distance between the sub-coverage area and the network device, or a longer distance between any sub-coverage area and the network device indicates a longer length of a random access preamble indicated by random access preamble format information corresponding to the sub-coverage area.

For ease of understanding, in this embodiment of this application, a distance between any sub-coverage area and the network device is described.

In a possible implementation, the distance between any sub-coverage area and the network device is a distance between the network device and a point that is in the sub-coverage area and that is farthest away from the network device.

In another possible implementation, the distance between any sub-coverage area and the network device is a distance between the network device and a point that is in the sub-coverage area and that is closest to the network device.

In another possible implementation, the distance between any sub-coverage area and the network device is a distance between the network device and a center point in the sub-coverage area.

Certainly, the distance between any sub-coverage area and the network device may include another meaning. This is not limited in this embodiment of this application.

For example, the Doppler reference information may include but is not limited to: at least one Doppler threshold, where different Doppler thresholds correspond to different sub-coverage areas, and/or at least one Doppler change rate threshold, where different Doppler change rate thresholds correspond to different sub-coverage areas.

In a possible implementation, if the Doppler reference information may include but is not limited to n Doppler thresholds, the n Doppler thresholds are used to divide the preset coverage area of the network device into n+1 sub-coverage areas, where n is an integer greater than 0, and different Doppler thresholds correspond to different sub-coverage areas.

Figure 6:
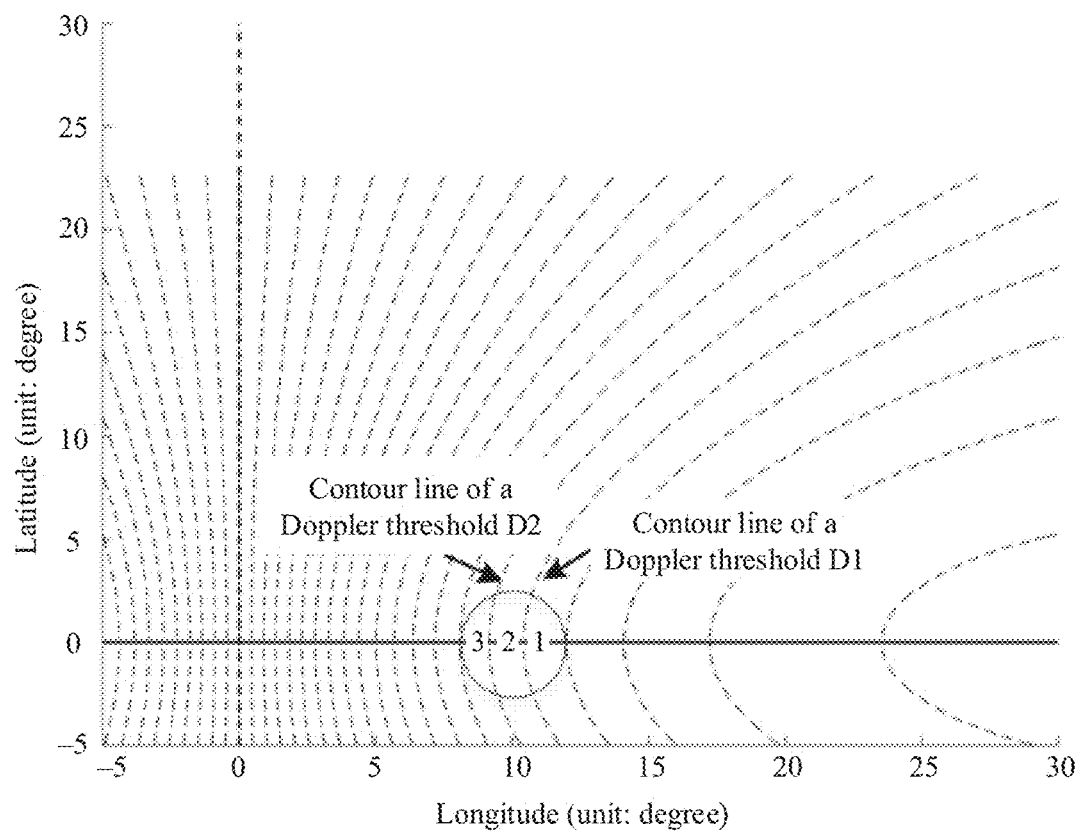
FIG. 6 is a schematic diagram 1 of division of a coverage area of a network device according to an embodiment of this application.

FIG. 6 is a schematic diagram 1 of division of a coverage area of a network device according to an embodiment of this application. As shown in FIG. 6, it is assumed that the network device is a satellite device that is directly above longitude and latitude coordinates (0, 0) and that moves from the west to the east in an equatorial direction, an orbital height of the satellite device is 1200 km, and a minimum elevation angle is 10 degrees. In FIG. 6, a dashed line indicates a contour line of a Doppler threshold in a coverage area of the satellite device, a black straight line indicates a projection of a moving track of the satellite device on a surface of the earth, and a circle on the black straight line indicates a preset coverage area in the coverage area of the satellite device.

As shown in FIG. 6, if the Doppler reference information may include a Doppler threshold D1 and a Doppler threshold D2, a contour line of the Doppler threshold D1 and a contour line of the Doppler threshold D2 divide the preset coverage area of the network device into three sub-coverage areas.

Table 1 is a first table of mapping information among preset Doppler information, Doppler reference information, a sub-coverage area, and random access preamble format information according to an embodiment of this application. With reference to FIG. 6 and Table 1, the Doppler information includes a Doppler value D, and the Doppler reference information includes a Doppler threshold D1 and a Doppler threshold D2 that are used to divide the preset coverage area into a sub-coverage area 1, a sub-coverage area 2, and a sub-coverage area 3.

A distance between the sub-coverage area 1 and the satellite device is greater than a distance between the sub-coverage area 2 and the satellite device. The distance between the sub-coverage area 2 and the satellite device is greater than a distance between the sub-coverage area 3 and the satellite device. Correspondingly, a length of a random access preamble indicated by random access preamble format information 1 corresponding to the sub-coverage area 1 is greater than a length of a random access preamble indicated by random access preamble format information 2 corresponding to the sub-coverage area 2. The length of the random access preamble indicated by the random access preamble format information 2 corresponding to the sub-coverage area 2 is greater than a length of a random access preamble indicated by random access preamble format information 3 corresponding to the sub-coverage area 3.

TABLE 1

First table of mapping information among preset Doppler information, Doppler reference information, a sub-coverage area, and random access preamble format information according to an embodiment of this application

| Comparison between Doppler information and Doppler reference information | $D > D1$ | $D2 \leq D \leq D1$ | $D < D2$ |
|---|---|---|---|
| Sub-coverage area | Sub-coverage area 1 | Sub-coverage area 2 | Sub-coverage area 3 |
| Random access preamble format information | Random access preamble format information 1 | Random access preamble format information 2 | Random access preamble format information 3 |

It should be understood that, if the Doppler value D is equal to the Doppler threshold D1, a location corresponding to the Doppler value D may alternatively belong to the sub-coverage area 1; and/or if the Doppler value D is equal to the Doppler threshold D2, a location corresponding to the Doppler value D may alternatively belong to the sub-coverage area 3. It should be noted that, for variation of an "equal sign" in the following Table 2 and Table 3, processing may also be performed in a similar variation manner.

It should be understood that the length relationship of the random access preamble indicated by the random access preamble format information in Table 1 listed in the foregoing implementation is only a possible example, and that random access preambles corresponding to adjacent different sub-coverage areas have a same sequence length is not ruled out. For example, the lengths of the random access preambles indicated by the random access preamble format information corresponding to the adjacent sub-coverage area 1 and sub-coverage area 2 in the foregoing Table 1 are the same. Alternatively, a length of a random access preamble corresponding to a sub-coverage area with a large distance from the satellite device is not shorter than a length of a random access preamble corresponding to a sub-coverage area with a small distance from the satellite device.

In this case, a terminal device in a sub-coverage area close to the satellite device is less affected by a channel Doppler frequency shift, and random access preamble format information (or referred to as a random access preamble format) with a small subcarrier spacing may be used. However, a terminal device in a sub-coverage area far away from the satellite device is greatly affected by a channel Doppler frequency shift, and a random access preamble format with a large subcarrier spacing needs to be used. A large subcarrier spacing means that a random access preamble occupies a small quantity of time domain resources. Therefore, when requirements of Doppler frequency shifts in different sub-coverage areas on subcarrier spacings of random access preambles are considered, random access preambles corresponding to different sub-coverage areas may have a same sequence length. In addition, a preselection pool of different quantities of random access preamble root sequences and corresponding time-frequency resources may be allocated to different sub-coverage areas based on a factor such as area sizes of different sub-coverage areas. For example, a preselection pool of a large quantity of random access preamble root sequences and a corresponding large quantity of time-frequency resources are allocated to a large sub-coverage area.

In conclusion, in this embodiment of this application, flexible random access preamble formats that meet a performance requirement may be configured for different sub-coverage areas, to optimize system resource configuration.

In another possible implementation, if the Doppler reference information may include but is not limited to m Doppler change rate thresholds, the m Doppler change rate thresholds are used to divide the preset coverage area of the network device into m+1 sub-coverage areas, where m is an integer greater than 0, and different Doppler change rate thresholds correspond to different sub-coverage areas.

Figure 7:
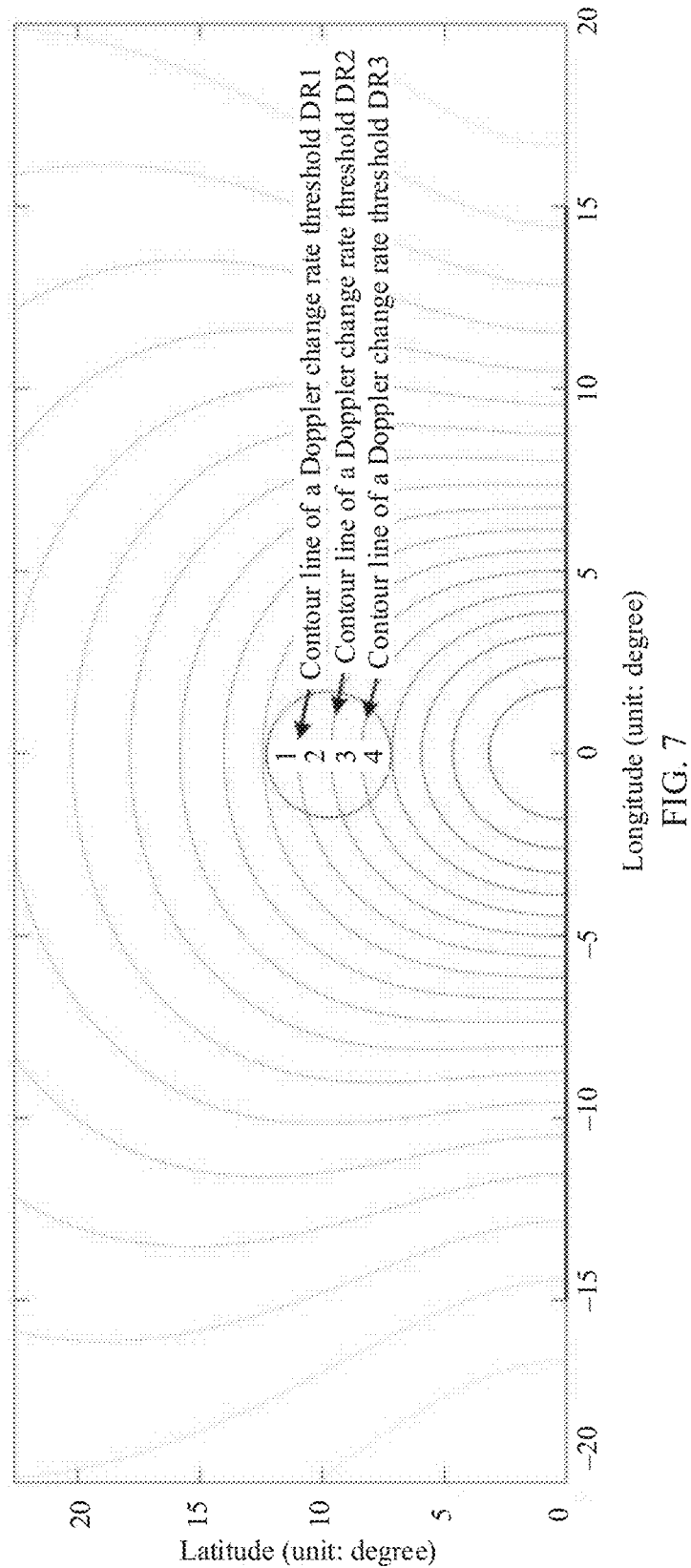
FIG. 7 is a schematic diagram 2 of division of a coverage area of a network device according to an embodiment of this application.

FIG. 7 is a schematic diagram 2 of division of a coverage area of a network device according to an embodiment of this application. As shown in FIG. 7, it is assumed that the network device is a satellite device that is directly above longitude and latitude coordinates (0, 0) and that moves from the west to the east in an equatorial direction, an orbital height of the satellite device is 1200 km, and a minimum elevation angle is 10 degrees. In FIG. 7, a solid line indicates a contour line of a Doppler change rate threshold in a coverage area of the satellite device, a black straight line indicates a projection of a moving track of the satellite device on a surface of the earth, and a circle in the middle in FIG. 7 indicates a preset coverage area in the coverage area of the satellite device.

As shown in FIG. 7, if the Doppler reference information may include a Doppler change rate threshold DR1, a Doppler change rate threshold DR2, and a Doppler change rate threshold DR3, a contour line of the Doppler change rate threshold DR1, a contour line of the Doppler change rate threshold DR2, and a contour line of the Doppler change rate threshold DR3 divide the preset coverage area of the network device into four sub-coverage areas.

Table 2 is a second table of mapping information among preset Doppler information, Doppler reference information, a sub-coverage area, and random access preamble format information according to an embodiment of this application. With reference to FIG. 7 and Table 2, the Doppler information includes a Doppler change rate value DR, and the Doppler reference information includes a Doppler change rate threshold DR1, a Doppler change rate threshold DR2, and a Doppler change rate threshold DR3 that are used to divide the preset coverage area into a sub-coverage area 1, a sub-coverage area 2, a sub-coverage area 3, and a sub-coverage area 4.

A distance between the sub-coverage area 1 and the satellite device is greater than a distance between the sub-coverage area 2 and the satellite device. The distance between the sub-coverage area 2 and the satellite device is greater than a distance between the sub-coverage area 3 and the satellite device. The distance between the sub-coverage area 3 and the satellite device is greater than a distance between the sub-coverage area 4 and the satellite device.

Correspondingly, a length of a random access preamble indicated by random access preamble format information 1 corresponding to the sub-coverage area 1 is greater than a length of a random access preamble indicated by random access preamble format information 2 corresponding to the sub-coverage area 2. The length of the random access preamble indicated by the random access preamble format information 2 corresponding to the sub-coverage area 2 is greater than a length of a random access preamble indicated by random access preamble format information 3 corresponding to the sub-coverage area 3. The length of the random access preamble indicated by the random access preamble format information 3 corresponding to the sub-coverage area 3 is greater than a length of a random access preamble indicated by random access preamble format information 4 corresponding to the sub-coverage area 4.

TABLE 2

Second table of mapping information among preset Doppler information, Doppler reference information, a sub-coverage area, and random access preamble format information according to an embodiment of this application

| Comparison between Doppler information and Doppler reference information | DR > DR1 | DR2 ≤ DR ≤ DR1 | DR3 < DR < DR2 | DR ≤ DR3 |
|---|---|---|---|---|
| Sub-coverage area | Sub-coverage area 1 | Sub-coverage area 2 | Sub-coverage area 3 | Sub-coverage area 4 |
| Random access preamble format information | Random access preamble format information 1 | Random access preamble format information 2 | Random access preamble format information 3 | Random access preamble format information 4 |

It should be understood that, if the Doppler change rate value DR is equal to the Doppler change rate value DR1, a location corresponding to the Doppler change rate value DR may alternatively belong to the sub-coverage area 1, if the Doppler change rate value DR is equal to the Doppler change rate value DR2, a location corresponding to the Doppler change rate value DR may alternatively belong to the sub-coverage area 3; and/or if the Doppler change rate value DR is equal to the Doppler change rate value DR3, a location corresponding to the Doppler change rate value DR may alternatively belong to the sub-coverage area 3.

It should be understood that the length relationship of the random access preamble indicated by the random access preamble format information in Table 2 listed in the foregoing implementation is only a possible example, and that random access preambles corresponding to adjacent different sub-coverage areas have a same sequence length is not ruled out. For example, the lengths of the random access preambles indicated by the random access preamble format information corresponding to the adjacent sub-coverage area 2 and sub-coverage area 3 in the foregoing Table 2 are the same. Alternatively, a length of a random access preamble corresponding to a sub-coverage area with a large distance from the satellite device is not shorter than a length of a random access preamble corresponding to a sub-coverage area with a small distance from the satellite device.

In this case, a terminal device in a sub-coverage area close to the satellite device is less affected by a channel Doppler frequency shift, and a random access preamble format with a small subcarrier spacing may be used. However, a terminal device in a sub-coverage area far away from the satellite device is greatly affected by a channel Doppler frequency shift, and a random access preamble format with a large subcarrier spacing needs to be used. A large subcarrier spacing means that a random access preamble occupies a small quantity of time domain resources. Therefore, when requirements of Doppler frequency shifts in different sub-coverage areas on subcarrier spacings of random access preambles are considered, random access preambles corresponding to different sub-coverage areas may have a same sequence length. In addition, a preselection pool of different quantities of random access preamble root sequences and corresponding time-frequency resources may be allocated to different sub-coverage areas based on a factor such as area sizes of different sub-coverage areas. For example, a preselection pool of a large quantity of random access preamble root sequences and a corresponding large quantity of time-frequency resources are allocated to a large sub-coverage area.

In conclusion, in this embodiment of this application, flexible random access preamble formats that meet a performance requirement may be configured for different sub-coverage areas, to optimize system resource configuration.

Figure 8:
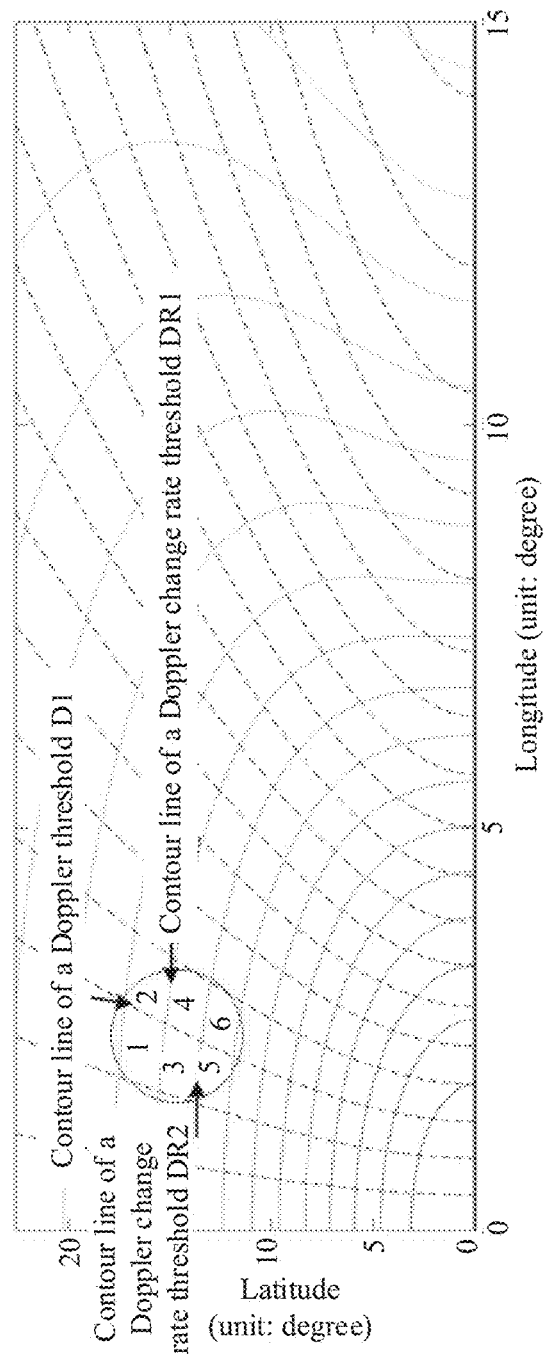
FIG. 8 is a schematic diagram 3 of division of a coverage area of a network device according to an embodiment of this application.

Table 3 is a third table of mapping information among preset Doppler information, Doppler reference information, a sub-coverage area, and random access preamble format information according to an embodiment of this application. With reference to FIG. 8 and Table 3, the Doppler information includes a Doppler value D and a Doppler change rate value DR, and the Doppler reference information includes a Doppler threshold D1, a Doppler change rate threshold DR1, and a Doppler change rate threshold DR2 that are used to divide the preset coverage area into a sub-coverage area 1, a sub-coverage area 2, a sub-coverage area 3, a sub-coverage area 4, a sub-coverage area 5, and a sub-coverage area 6.

The sub-coverage area 2 and the sub-coverage area 3 are used as an example. A distance between the sub-coverage area 2 and the satellite device is greater than a distance between the sub-coverage area 3 and the satellite device. Correspondingly, a length of a random access preamble indicated by random access preamble format information 2 corresponding to the sub-coverage area 2 is greater than a length of a random access preamble indicated by random access preamble format information 3 corresponding to the sub-coverage area 3.

TABLE 3

Third table of mapping information among preset Doppler information, Doppler reference information, a sub-coverage area, and random access preamble format information according to an embodiment of this application

| Comparison between Doppler information and Doppler reference information | $D \leq D1$, and $DR > DR1$ | $D > D1$, and $DR > DR1$ | $D \leq D1$, and $DR2 \leq DR \leq DR1$ | $D > D1$, and $DR2 \leq DR \leq DR1$ | $D \leq D1$, and $DR < DR2$ | $D > D1$, and $DR < DR2$ |
|---|---|---|---|---|---|---|
| Sub-coverage area | Sub-coverage area 1 | Sub-coverage area 2 | Sub-coverage area 3 | Sub-coverage area 4 | Sub-coverage area 5 | Sub-coverage area 6 |
| Random access preamble format information | Random access preamble format information 1 | Random access preamble format information 2 | Random access preamble format information 3 | Random access preamble format information 4 | Random access preamble format information 5 | Random access preamble format information 6 |

In another possible implementation, if the Doppler reference information includes n Doppler thresholds and m Doppler change rate thresholds, the n Doppler thresholds and the m Doppler change rate thresholds are used to divide the preset coverage area of the network device into (n+1)*(m+1) sub-coverage areas, where different Doppler thresholds and different Doppler change rate thresholds correspond to different sub-coverage areas.

FIG. 8 is a schematic diagram 3 of division of a coverage area of a network device according to an embodiment of this application. As shown in FIG. 8, it is assumed that the network device is a satellite device that is directly above longitude and latitude coordinates (0, 0) and that moves from the west to the east in an equatorial direction, an orbital height of the satellite device is 1200 km, and a minimum elevation angle is 10 degrees. In FIG. 8, a dashed line indicates a contour line of a Doppler threshold in a coverage area of the satellite device, a solid line indicates a contour line of a Doppler change rate threshold, a black straight line indicates a projection of a moving track of the satellite device on a surface of the earth, and a circle at an upper left part in FIG. 8 indicates a preset coverage area in the coverage area of the satellite device.

As shown in FIG. 8, if the Doppler reference information includes a Doppler threshold D1, a Doppler change rate threshold DR1, and a Doppler change rate threshold DR2, a contour line of the Doppler threshold D1, a contour line of the Doppler change rate threshold DR1, and a contour line of the Doppler change rate threshold DR2 are used to divide the preset coverage area of the network device into six sub-coverage areas.

It should be understood that, for variation of an "equal sign" in the foregoing Table 3, processing may be performed in the variation processing manner of the "equal sign" in the foregoing Table 1 or Table 2. For example, if the Doppler value D is equal to the Doppler threshold D1, and the Doppler change rate value DR is equal to the Doppler change rate threshold DR1, a location corresponding to the Doppler value D and the Doppler change rate value DR may alternatively belong to the sub-coverage area 1, the sub-coverage area 2, or the sub-coverage area 4. It should be understood that the length relationship of the random access preamble indicated by the random access preamble format information in Table 3 listed in the foregoing implementation is only a possible example, and that random access preambles corresponding to adjacent different sub-coverage areas have a same sequence length is not ruled out. For example, the length of the random access preamble indicated by the random access preamble format information corresponding to the adjacent sub-coverage area 2 and sub-coverage area 4 in the foregoing Table 3 are the same. Alternatively, a length of a random access preamble corresponding to a sub-coverage area with a large distance from the satellite device is not shorter than a length of a random access preamble corresponding to a sub-coverage area with a small distance from the satellite device.

In this case, a terminal device in a sub-coverage area close to the satellite device is less affected by a channel Doppler frequency shift, and a random access preamble format with a small subcarrier spacing may be used. However, a terminal device in a sub-coverage area far away from the satellite device is greatly affected by a channel Doppler frequency shift, and a random access preamble format with a large subcarrier spacing needs to be used. A large subcarrier spacing means that a random access preamble occupies a small quantity of time domain resources. Therefore, when requirements of Doppler frequency shifts in different sub-coverage areas on subcarrier spacings of random access preambles are considered, random access preambles corresponding to different sub-coverage areas may have a same sequence length. In addition, a preselection pool of different quantities of random access preamble root sequences and corresponding time-frequency resources may be allocated to different sub-coverage areas based on a factor such as area sizes of different sub-coverage areas. For example, a preselection pool of a large quantity of random access preamble root sequences and a corresponding large quantity of time-frequency resources are allocated to a large sub-coverage area.

In conclusion, in this embodiment of this application, flexible random access preamble formats that meet a performance requirement may be configured for different sub-coverage areas, to optimize system resource configuration.

It should be noted that the division manner of the sub-coverage areas in the preset coverage area may be another manner. This is not limited in this embodiment of this application.

Step S502. The terminal device determines, based on the target sub-coverage area to which the terminal device belongs in the preset coverage area of the network device, the target random access preamble format information corresponding to the target sub-coverage area.

Optionally, the target sub-coverage area is associated with the Doppler information of the location of the terminal device and the Doppler reference information obtained from the network device.

For example, before performing step S502, the terminal device may determine, based on a downlink signal sent by the network device, the Doppler information of the location of the terminal device. For example, the terminal device detects a frequency offset of a frequency on which the downlink signal sent by the network device is located, and further determines the Doppler information of the location of the terminal device based on the frequency offset. The downlink signal may include but is not limited to a synchronization signal/physical broadcast block (SSB) signal or another synchronization signal.

Certainly, the terminal device may determine, in another manner, the Doppler information of the location of the terminal device. This is not limited in this embodiment of this application.

For example, the terminal device may determine, based on the Doppler information of the location of the terminal device and the Doppler reference information obtained from the network device, the target sub-coverage area to which the terminal device belongs in the preset coverage area of the network device.

In a possible implementation, if the Doppler reference information includes at least one Doppler threshold, and the Doppler information correspondingly includes a Doppler value, the terminal device determines, based on the Doppler value of the location of the terminal device and the at least one Doppler threshold, the target sub-coverage area to which the terminal device belongs in the preset coverage area of the network device.

For example, with reference to FIG. 6 and the foregoing Table 1, if the Doppler reference information may include a Doppler threshold D1 and a Doppler threshold D2, and a contour line of the Doppler threshold D1 and a contour line of the Doppler threshold D2 divide the preset coverage area of the network device into three sub-coverage areas, the terminal device determines, based on the Doppler value D of the location of the terminal device, the Doppler threshold D1, and the Doppler threshold D2, the target sub-coverage area to which the terminal device belongs in the preset coverage area of the network device.

It should be understood that, if the Doppler value D of the location of the terminal device is greater than the Doppler threshold D1, the terminal device may determine that the target sub-coverage area to which the terminal device belongs in the preset coverage area of the network device is the sub-coverage area 1. Alternatively, if the Doppler value D of the location of the terminal device is less than or equal to the Doppler threshold D1, and is greater than or equal to the Doppler threshold D2, the terminal device may determine that the target sub-coverage area to which the terminal device belongs in the preset coverage area of the network device is the sub-coverage area 2. Alternatively, if the Doppler value D of the location of the terminal device is less than the Doppler threshold D2, the terminal device may determine that the target sub-coverage area to which the terminal device belongs in the preset coverage area of the network device is the sub-coverage area 3.

It should be noted that, if the location corresponding to the Doppler value D may belong to at least two sub-coverage areas, the terminal device may randomly select one sub-coverage area from the at least two sub-coverage areas as the target sub-coverage area. Alternatively, the terminal device may select the target sub-coverage area from the at least two sub-coverage areas based on a length of a random access preamble indicated by random access preamble format information corresponding to each sub-coverage area. A length of a random access preamble indicated by random access preamble format information corresponding to the target sub-coverage area is the shortest. Certainly, the terminal device may select the target sub-coverage area from the at least two sub-coverage areas in another manner. This is not limited in this embodiment of this application.

In another possible implementation, if the Doppler reference information includes at least one Doppler change rate threshold, and the Doppler information correspondingly includes a Doppler change rate value, the terminal device determines, based on the Doppler change rate value of the location of the terminal device and the at least one Doppler change rate threshold, the target sub-coverage area to which the terminal device belongs in the preset coverage area of the network device.

For example, with reference to FIG. 7 and the foregoing Table 2, if the Doppler reference information may include a Doppler change rate threshold DR1, a Doppler change rate threshold DR2, and a Doppler change rate threshold DR3, and a contour line of the Doppler change rate threshold DR1, a contour line of the Doppler change rate threshold DR2, and a contour line of the Doppler change rate threshold DR3 divide the preset coverage area of the network device into four sub-coverage areas, the terminal device determines, based on the Doppler change rate value DR of the location of the terminal device, the Doppler change rate threshold DR1, the Doppler change rate threshold DR2, and the Doppler change rate threshold DR3, the target coverage area to which the terminal device belongs in the preset coverage area of the network device.

It should be understood that, if the Doppler change rate value DR of the location of the terminal device is greater than the Doppler change rate threshold DR1, the terminal device may determine that the target sub-coverage area to which the terminal device belongs in the preset coverage area of the network device is the sub-coverage area 1. Alternatively, if the Doppler change rate value DR of the location of the terminal device is less than or equal to the Doppler change rate threshold DR1, and is greater than or equal to the Doppler change rate threshold DR2, the terminal device may determine that the target sub-coverage area to which the terminal device belongs in the preset coverage area of the network device is the sub-coverage area 2. Alternatively, if the Doppler change rate value DR of the location of the terminal device is less than the Doppler change rate threshold DR2, and is greater than the Doppler change rate threshold DR3, the terminal device may determine that the target sub-coverage area to which the terminal device belongs in the preset coverage area of the network device is the sub-coverage area 3. Alternatively, if the Doppler change rate value DR of the location of the terminal device is less than or equal to the Doppler change rate threshold DR3, the terminal device may determine that the target sub-coverage area to which the terminal device belongs in the preset coverage area of the network device is the sub-coverage area 4.

It should be noted that, if the location corresponding to the Doppler change rate value DR may belong to at least two sub-coverage areas, the terminal device may randomly select one sub-coverage area from the at least two sub-coverage areas as the target sub-coverage area. Alternatively, the terminal device may select the target sub-coverage area from the at least two sub-coverage areas based on a length of a random access preamble indicated by random access preamble format information corresponding to each sub-coverage area. A length of a random access preamble indicated by random access preamble format information corresponding to the target sub-coverage area is the shortest. Certainly, the terminal device may select the target sub-coverage area from the at least two sub-coverage areas in another manner. This is not limited in this embodiment of this application.

In another possible implementation, if the Doppler reference information includes at least one Doppler threshold and at least one Doppler change rate threshold, and the Doppler information correspondingly includes a Doppler value and a Doppler change rate value, the terminal device determines, based on the Doppler value and the Doppler change rate value of the location of the terminal device, the at least one Doppler threshold, and the at least one Doppler change rate threshold, the target sub-coverage area to which the terminal device belongs in the preset coverage area of the network device.

For example, with reference to FIG. 8 and the foregoing Table 3, if the Doppler reference information may include a Doppler threshold D1, a Doppler change rate threshold DR1, and a Doppler change rate threshold DR2, and a contour line of the Doppler threshold D1, a contour line of the Doppler change rate threshold DR1, and a contour line of the Doppler change rate threshold DR2 divide the preset coverage area of the network device into six sub-coverage areas, the terminal device determines, based on the Doppler value D and the Doppler change rate value DR of the location of the terminal device, the Doppler threshold D1, the Doppler change rate threshold DR1, and the Doppler change rate threshold DR2, the target coverage area to which the terminal device belongs in the preset coverage area of the network device.

It should be understood that, if the Doppler value D of the location of the terminal device is less than or equal to the Doppler threshold D1, and the Doppler change rate value DR is greater than the Doppler change rate threshold DR1, the terminal device may determine that the target sub-coverage area to which the terminal device belongs in the preset coverage area of the network device is the sub-coverage area 1. Alternatively, if the Doppler value D of the location of the terminal device is greater than the Doppler threshold D1, and the Doppler change rate value DR is greater than the Doppler change rate threshold DR1, the terminal device may determine that the target sub-coverage area to which the terminal device belongs in the preset coverage area of the network device is the sub-coverage area 2.

Alternatively, if the Doppler value D of the location of the terminal device is less than or equal to the Doppler threshold D1, and the Doppler change rate value DR is less than or equal to the Doppler change rate threshold DR1 and is greater than or equal to the Doppler change rate threshold DR2, the terminal device may determine that the target sub-coverage area to which the terminal device belongs in the preset coverage area of the network device is the sub-coverage area 3. Alternatively, if the Doppler value D of the location of the terminal device is greater than the Doppler threshold D1, and the Doppler change rate value DR is less than or equal to the Doppler change rate threshold DR1 and is greater than or equal to the Doppler change rate threshold DR2, the terminal device may determine that the target sub-coverage area to which the terminal device belongs in the preset coverage area of the network device is the sub-coverage area 4.

Alternatively, if the Doppler value D of the location of the terminal device is less than or equal to the Doppler threshold D1, and the Doppler change rate value DR is less than the Doppler change rate threshold DR2, the terminal device may determine that the target sub-coverage area to which the terminal device belongs in the preset coverage area of the network device is the sub-coverage area 5. Alternatively, if the Doppler value D of the location of the terminal device is greater than the Doppler threshold D1, and the Doppler change rate value DR is less than the Doppler change rate threshold DR2, the terminal device may determine that the target sub-coverage area to which the terminal device belongs in the preset coverage area of the network device is the sub-coverage area 6.

It should be noted that, if the location corresponding to the Doppler value D and the Doppler change rate value DR may belong to at least two sub-coverage areas, the terminal device may randomly select one sub-coverage area from the at least two sub-coverage areas as the target sub-coverage area. Alternatively, the terminal device may select the target sub-coverage area from the at least two sub-coverage areas based on a length of a random access preamble indicated by random access preamble format information corresponding to each sub-coverage area. A length of a random access preamble indicated by random access preamble format information corresponding to the target sub-coverage area is the shortest. Certainly, the terminal device may select the target sub-coverage area from the at least two sub-coverage areas in another manner. This is not limited in this embodiment of this application.

It should be understood that, before performing step S502, the terminal device receives the Doppler reference information sent by the network device. However, it should be noted that the terminal device does not need to receive, each time before step S502 is performed, the Doppler reference information sent by the network device. This may depend on a specific application scenario.

Further, the terminal device may determine, from the obtained at least two pieces of random access preamble format information based on mapping information between a preset sub-coverage area and random access preamble format information, the target random access preamble format information corresponding to the target sub-coverage area.

In this embodiment of this application, the mapping information between a preset sub-coverage area and random access preamble format information is preconfigured on the terminal device, for example, the mapping information that is between a preset sub-coverage area and random access preamble format information and that is shown in the foregoing Table 1 to Table 3. The mapping information between a preset sub-coverage area and random access preamble format information may include but is not limited to mapping information between the target sub-coverage area and the target random access preamble format information. It should be understood that the mapping information between a preset sub-coverage area and random access preamble format information may further include mapping information between another sub-coverage area and random access preamble format information corresponding to the sub-coverage area.

It should be noted that an expression form of the mapping information between a preset sub-coverage area and random access preamble format information is not limited to a table form, and another expression form may be used.

It should be understood that the mapping information between a preset sub-coverage area and random access preamble format information on the terminal device may be preset by the system or the network device.

For example, the network device may send the mapping information between a preset sub-coverage area and random access preamble format information to the terminal device. For example, the network device may add the mapping information between a preset sub-coverage area and random access preamble format information to at least one message in broadcast information such as a system information block (SIB) 1, other system information (OSI), and a master information block (MIB), to send the mapping information to the terminal device through broadcast or multicast. If the mapping information is sent in a radio resource control (RRC) connection phase (the mapping relationship is updated and provided for the terminal device to request, after interruption, to access the system again), the network device may add the updated mapping information to at least one piece of information in RRC information, downlink control information (DCI), group DCI, and a media access control (MAC) element, to send the updated mapping information to the terminal device, or the network device may add send the updated mapping information to the terminal device with data transmission or on a separately allocated physical downlink shared channel (PDSCH).

Certainly, the mapping information between a preset sub-coverage area and random access preamble format information on the terminal device may be obtained in another manner. This is not limited in this embodiment of this application.

In a possible implementation, if the terminal device determines, based on the Doppler value D of the location of the terminal device, the Doppler threshold D1, and the Doppler threshold D2, that the target sub-coverage area to which the terminal device belongs in the preset coverage area of the network device is the sub-coverage area 1 in the foregoing Table 1, the terminal device may determine, from the obtained random access preamble format information 1 to random access preamble format information 3 based on the mapping information that is between a preset sub-coverage area and random access preamble format information and that is shown in the foregoing Table 1, the target random access preamble format information (such as the random access preamble format information 1 in the foregoing Table 1) corresponding to the target sub-coverage area.

In another possible implementation, if the terminal device determines, based on the Doppler change rate value DR of the location of the terminal device, the Doppler change rate threshold DR1, the Doppler change rate threshold DR2, and the Doppler change rate threshold DR3, that the target sub-coverage area to which the terminal device belongs in the preset coverage area of the network device is the sub-coverage area 2 in the foregoing Table 2, the terminal device may determine, from the obtained random access preamble format information 1 to random access preamble format information 4 based on the mapping information that is between a preset sub-coverage area and random access preamble format information and that is shown in the foregoing Table 2, the target random access preamble format information (such as the random access preamble format information 2 in the foregoing Table 2) corresponding to the target sub-coverage area.

In another possible implementation, if the terminal device determines, based on the Doppler value D and the Doppler change rate value DR of the location of the terminal device, the Doppler threshold D1, the Doppler change rate threshold DR1, and the Doppler change rate threshold DR2, that the target sub-coverage area to which the terminal device belongs in the preset coverage area of the network device is the sub-coverage area 3 in the foregoing Table 3, the terminal device may determine, from the obtained random access preamble format information 1 to random access preamble format information 6 based on the mapping information that is between a preset sub-coverage area and random access preamble format information and that is shown in the foregoing Table 3, the target random access preamble format information (such as the random access preamble format information 3 in the foregoing Table 3) corresponding to the target sub-coverage area.

It should be understood that, before performing step S502, the terminal device receives the random access preamble configuration information sent by the network device. The random access preamble configuration information includes the at least two pieces of random access preamble format information and the random access preamble time-frequency resource information corresponding to each piece of random access preamble format information. However, it should be noted that the terminal device does not need to receive, each time before step S502 is performed, the random access preamble configuration information sent by the network device. This may depend on a specific application scenario.

It should be noted that the terminal device may not need to perform the foregoing step of determining the target sub-coverage area, and may determine, based on the mapping information (for example, comparison between the Doppler information and the Doppler reference information and the corresponding random access preamble format information that are shown in the foregoing Table 1 to Table 3) among preset Doppler information, Doppler reference information, and random access preamble format information, the target random access preamble format information corresponding to the Doppler information of the location of the terminal device.

Step S503. The terminal device sends, to the network device on a target time-frequency resource corresponding to target random access preamble time-frequency resource information, a random access preamble corresponding to the target random access preamble format information.

In this embodiment of this application, the terminal device obtains, in advance, the random access preamble configuration information sent by the network device. The random access preamble configuration information includes the at least two pieces of random access preamble format information and the random access preamble time-frequency resource information corresponding to each piece of random access preamble format information.

In this step, the terminal device may determine, as the target random access preamble time-frequency resource information from the random access preamble time-frequency resource information corresponding to each piece of random access preamble format information sent by the network device, random access preamble time-frequency resource information corresponding to the target random access preamble format information, and send, to the network device on the target time-frequency resource corresponding to the target random access preamble time-frequency resource information, the random access preamble corresponding to the target random access preamble format information.

Step S504. The network device receives the random access preamble sent by the terminal device on the target time-frequency resource.

In this step, the network device receives the random access preamble that corresponds to the target random access preamble format information and that is sent by the terminal device to the network device on the target time-frequency resource corresponding to the target random access preamble time-frequency resource information. The target random access preamble time-frequency resource information is random access preamble time-frequency resource information that corresponds to the target random access preamble format information and that is in at least two pieces of random access preamble time-frequency resource information sent by the network device to the terminal device. The target random access preamble format information is one piece of random access preamble format information in the at least two pieces of random access preamble format information sent by the network device to the terminal device, and the target random access preamble format information is associated with the target sub-coverage area to which the terminal device belongs in the at least two sub-coverage areas in the preset coverage area of the network device.

In conclusion, in this embodiment of this application, the network device sends the random access preamble configuration information and the Doppler reference information to the terminal device. The random access preamble configuration information may include but is not limited to the at least two pieces of random access preamble format information and the random access preamble time-frequency resource information corresponding to each piece of random access preamble format information. The Doppler reference information is used to indicate to divide the preset coverage area of the network device into the at least two sub-coverage areas. Correspondingly, the terminal device determines, based on the Doppler reference information, the target sub-coverage area to which the terminal device belongs in the preset coverage area of the network device, and determines, from the at least two pieces of random access preamble format information, the target random access preamble format information corresponding to the target sub-coverage area. Then, the terminal device sends, to the network device on the target time-frequency resource indicated by the target random access preamble time-frequency resource information corresponding to the target random access preamble format information, the random access preamble corresponding to the target random access preamble format information. It may be learned that, compared with a manner in a related technology in which lengths of random access preambles sent by terminal devices located in a same cell are the same, in this embodiment of this application, any terminal device may send a random access preamble based on a target sub-coverage area to which the terminal device belongs in the preset coverage area of the network device and by using random access preamble format information corresponding to the target sub-coverage area. In this way, a length of a random access preamble sent by a terminal device closer to the network device is shorter, and a length of a random access preamble sent by a terminal device farther away from the network device is longer, so that time-frequency resources used to transmit the random access preamble can be saved.

It should be noted that, each time before the terminal device performs step S502, the network device does not need to correspondingly perform step S501. This may depend on a specific application scenario.

Figure 9:
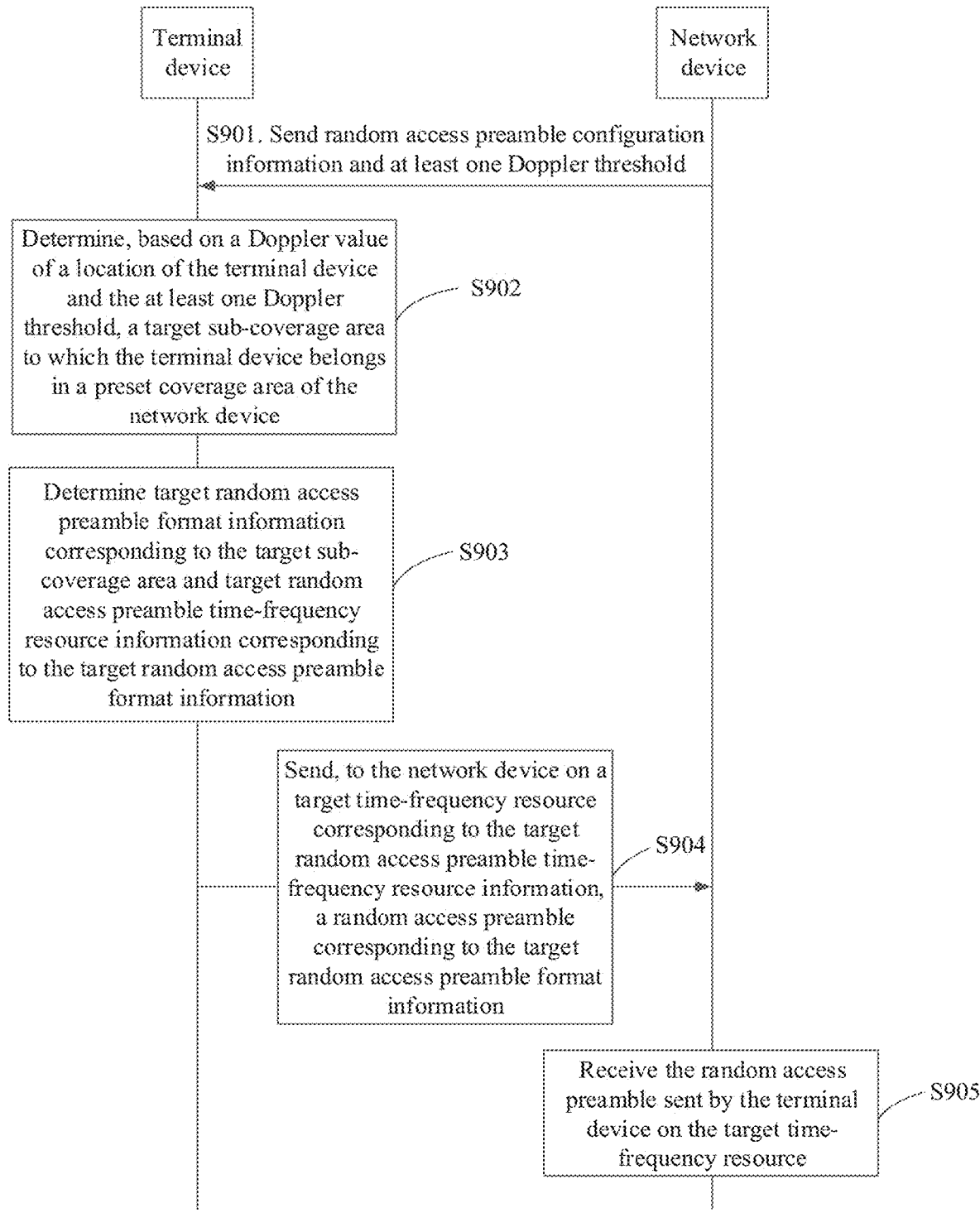
FIG. 9 is a schematic flowchart of a random access preamble transmission method according to another embodiment of this application.

FIG. 9 is a schematic flowchart of a random access preamble transmission method according to another embodiment of this application. On a basis of the foregoing embodiment, in this embodiment of this application, an implementation in which the Doppler information correspondingly includes a Doppler value if the Doppler reference information includes at least one Doppler threshold is described. As shown in FIG. 9, the method in this embodiment of this application may include the following steps.

Step S901. A network device sends random access preamble configuration information and at least one Doppler threshold to a terminal device.

For example, the at least one Doppler threshold may include a Doppler threshold D1 and a Doppler threshold D2. As shown in FIG. 6, a contour line of the Doppler threshold D1 and a contour line of the Doppler threshold D2 divide a preset coverage area (an area shown by a circle in FIG. 6) of the network device into a sub-coverage area 1, a sub-coverage area 2, and a sub-coverage area 3.

The random access preamble configuration information may include random access preamble format information corresponding to the sub-coverage area and random access preamble time-frequency resource information corresponding to each piece of random access preamble format information. For example, the random access preamble configuration information may include random access preamble format information 1 corresponding to the sub-coverage area 1, random access preamble format information 2 corresponding to the sub-coverage area 2, random access preamble format information 3 corresponding to the sub-coverage area 3, random access preamble time-frequency resource information 1 corresponding to the random access preamble format information 1, random access preamble time-frequency resource information 2 corresponding to the random access preamble format information 2, and random access preamble time-frequency resource information 3 corresponding to the random access preamble format information 3.

Step S902. The terminal device determines, based on a Doppler value of a location of the terminal device and the at least one Doppler threshold, a target sub-coverage area to which the terminal device belongs in the preset coverage area of the network device.

For example, the terminal device may determine, based on the mapping information that is among preset Doppler information, Doppler reference information, and a sub-coverage area and that is shown in the foregoing Table 1, the Doppler value D of the location of the terminal device, the Doppler threshold D1, and the Doppler threshold D2, the target sub-coverage area to which the terminal device belongs in the preset coverage area of the network device. For example, if the Doppler value D of the location of the terminal device is greater than the Doppler threshold D1, the terminal device may determine that the target sub-coverage area to which the terminal device belongs in the preset coverage area of the network device is the sub-coverage area 1.

Step S903. The terminal device determines target random access preamble format information corresponding to the target sub-coverage area and target random access preamble time-frequency resource information corresponding to the target random access preamble format information.

For example, the terminal device may determine, from the random access preamble format information 1 to the random access preamble format information 3 based on the mapping information that is between a preset sub-coverage area and random access preamble format information and that is shown in the foregoing Table 1, the target random access preamble format information corresponding to the target sub-coverage area, for example, the random access preamble format information 1.

Further, the terminal device may determine the target random access preamble time-frequency resource information corresponding to the target random access preamble format information, for example, the random access preamble time-frequency resource information 1.

Step S904. The terminal device sends, to the network device on a target time-frequency resource corresponding to the target random access preamble time-frequency resource information, a random access preamble corresponding to the target random access preamble format information.

Step S905. The network device receives the random access preamble sent by the terminal device on the target time-frequency resource.

It should be noted that the terminal device may not need to perform the foregoing step of determining the target sub-coverage area, and may determine, based on the mapping information (for example, comparison between the Doppler information and the Doppler reference information and the corresponding random access preamble format information that are shown in the foregoing Table 1) among preset Doppler information, Doppler reference information, and random access preamble format information, the target random access preamble format information corresponding to the Doppler information of the location of the terminal device.

In conclusion, in this embodiment of this application, the network device sends the random access preamble configuration information and the at least one Doppler threshold to the terminal device. The random access preamble configuration information may include but is not limited to at least two pieces of random access preamble format information and random access preamble time-frequency resource information corresponding to each piece of random access preamble format information. The at least one Doppler threshold is used to indicate to divide the preset coverage area of the network device into at least two sub-coverage areas.

Correspondingly, the terminal device determines, based on the at least one Doppler threshold, the target sub-coverage area to which the terminal device belongs in the preset coverage area of the network device, and determines, from the at least two pieces of random access preamble format information, the target random access preamble format information corresponding to the target sub-coverage area. Then, the terminal device sends, to the network device on the target time-frequency resource indicated by the target random access preamble time-frequency resource information corresponding to the target random access preamble format information, the random access preamble corresponding to the target random access preamble format information. It may be learned that, in this embodiment of this application, any terminal device may send a random access preamble based on a target sub-coverage area to which the terminal device belongs in the preset coverage area of the network device and by using random access preamble format information corresponding to the target sub-coverage area. In this way, a length of a random access preamble sent by a terminal device closer to the network device is shorter, and a length of a random access preamble sent by a terminal device farther away from the network device is longer, so that time-frequency resources used to transmit the random access preamble can be saved.

It should be noted that, each time before the terminal device performs step S902, the network device does not need to correspondingly perform step S901. This may depend on a specific application scenario.

Figure 10:
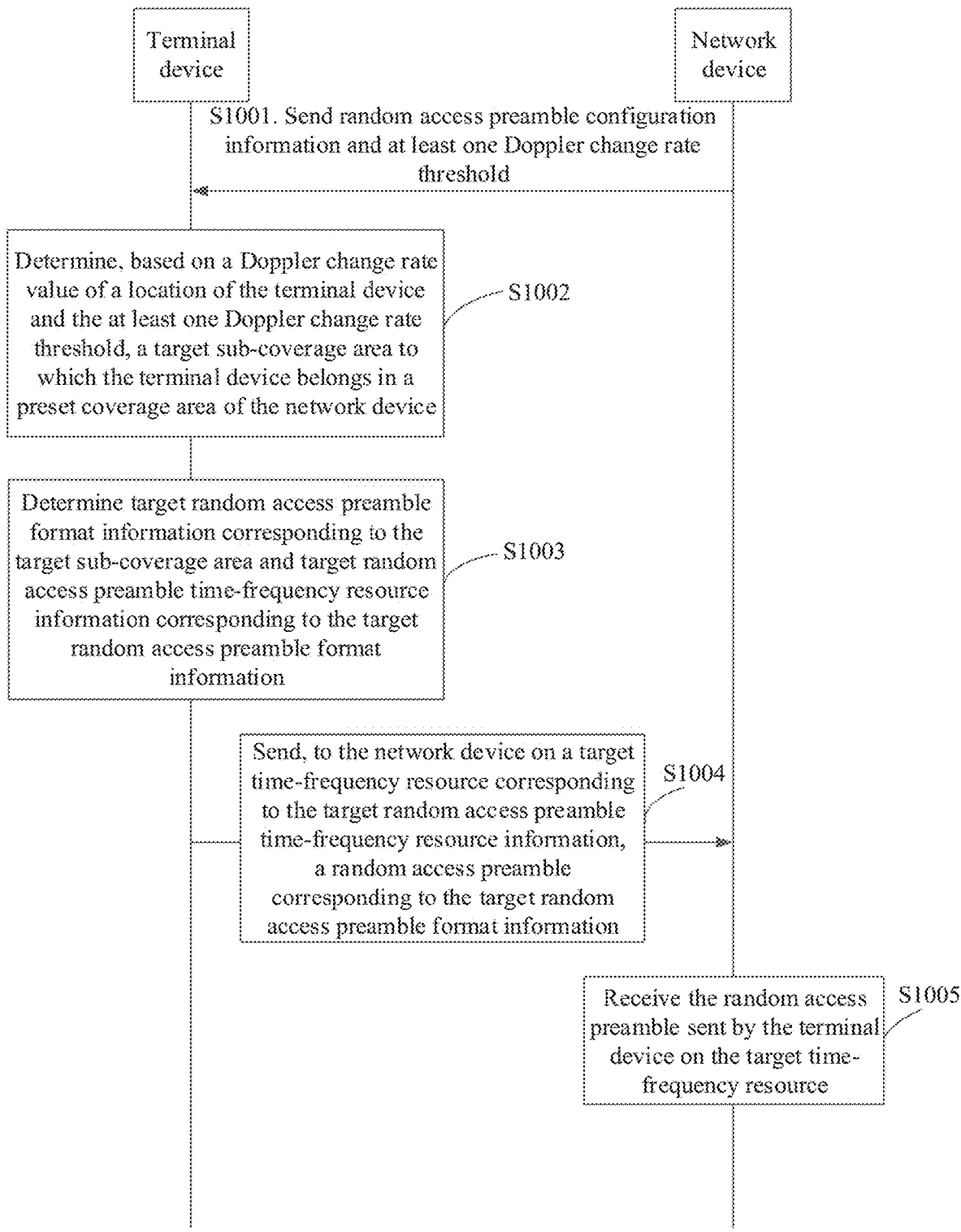
FIG. 10 is a schematic flowchart of a random access preamble transmission method according to another embodiment of this application.

FIG. 10 is a schematic flowchart of a random access preamble transmission method according to another embodiment of this application. On a basis of the foregoing embodiment, in this embodiment of this application, an implementation in which the Doppler information correspondingly includes a Doppler change rate value if the Doppler reference information includes at least one Doppler change rate threshold is described. As shown in FIG. 10, the method in this embodiment of this application may include the following steps.

Step S1001. A network device sends random access preamble configuration information and at least one Doppler change rate threshold to a terminal device.

For example, the at least one Doppler change rate threshold may include a Doppler change rate threshold DR1, a Doppler change rate threshold DR2, and a Doppler change rate threshold DR3. As shown in FIG. 7, a contour line of the Doppler change rate threshold DR1, a contour line of the Doppler change rate threshold DR2, and a contour line of the Doppler change rate threshold DR3 divide a preset coverage area (an area shown by a circle in FIG. 7) of the network device into a sub-coverage area 1, a sub-coverage area 2, a sub-coverage area 3, and a sub-coverage area 4.

The random access preamble configuration information may include random access preamble format information corresponding to the sub-coverage area and random access preamble time-frequency resource information corresponding to each piece of random access preamble format information. For example, the random access preamble configuration information may include random access preamble format information 1 corresponding to the sub-coverage area 1, random access preamble format information 2 corresponding to the sub-coverage area 2, random access preamble format information 3 corresponding to the sub-coverage area 3, random access preamble format information 4 corresponding to the sub-coverage area 4, random access preamble time-frequency resource information 1 corresponding to the random access preamble format information 1, random access preamble time-frequency resource information 2 corresponding to the random access preamble format information 2, random access preamble time-frequency resource information 3 corresponding to the random access preamble format information 3, and random access preamble time-frequency resource information 4 corresponding to the random access preamble format information 4.

Step S1002. The terminal device determines, based on a Doppler change rate value of a location of the terminal device and the at least one Doppler change rate threshold, a target sub-coverage area to which the terminal device belongs in the preset coverage area of the network device.

For example, the terminal device may determine, based on the mapping information that is among preset Doppler information, Doppler reference information, and a sub-coverage area and that is shown in the foregoing Table 2, the Doppler change rate value DR of the location of the terminal device, the Doppler change rate threshold DR1, the Doppler change rate threshold DR2, and the Doppler change rate threshold DR3, the target sub-coverage area to which the terminal device belongs in the preset coverage area of the network device. For example, if the Doppler change rate value DR of the location of the terminal device is greater than the Doppler change rate threshold DR1, the terminal device may determine that the target sub-coverage area to which the terminal device belongs in the preset coverage area of the network device is the sub-coverage area 1.

Step S1003. The terminal device determines target random access preamble format information corresponding to the target sub-coverage area and target random access preamble time-frequency resource information corresponding to the target random access preamble format information.

For example, the terminal device may determine, from the random access preamble format information 1 to the random access preamble format information 4 based on the mapping information that is between a preset sub-coverage area and random access preamble format information and that is shown in the foregoing Table 2, the target random access preamble format information corresponding to the target sub-coverage area, for example, the random access preamble format information 1.

Further, the terminal device may determine the target random access preamble time-frequency resource information corresponding to the target random access preamble format information, for example, the random access preamble time-frequency resource information 1.

Step S1004. The terminal device sends, to the network device on a target time-frequency resource corresponding to the target random access preamble time-frequency resource information, a random access preamble corresponding to the target random access preamble format information.

Step S1005. The network device receives the random access preamble sent by the terminal device on the target time-frequency resource.

It should be noted that the terminal device may not need to perform the foregoing step of determining the target sub-coverage area, and may determine, based on the mapping information (for example, comparison between the Doppler information and the Doppler reference information and the corresponding random access preamble format information that are shown in the foregoing Table 2) among preset Doppler information, Doppler reference information, and random access preamble format information, the target random access preamble format information corresponding to the Doppler information of the location of the terminal device.

In conclusion, in this embodiment of this application, the network device sends the random access preamble configuration information and the at least one Doppler change rate threshold to the terminal device. The random access preamble configuration information may include but is not limited to at least two pieces of random access preamble format information and random access preamble time-frequency resource information corresponding to each piece of random access preamble format information. The at least one Doppler change rate threshold is used to indicate to divide the preset coverage area of the network device into at least two sub-coverage areas. Correspondingly, the terminal device determines, based on the at least one Doppler change rate threshold, the target sub-coverage area to which the terminal device belongs in the preset coverage area of the network device, and determines, from the at least two pieces of random access preamble format information, the target random access preamble format information corresponding to the target sub-coverage area. Then, the terminal device sends, to the network device on the target time-frequency resource indicated by the target random access preamble time-frequency resource information corresponding to the target random access preamble format information, the random access preamble corresponding to the target random access preamble format information. It may be learned that, in this embodiment of this application, any terminal device may send a random access preamble based on a target sub-coverage area to which the terminal device belongs in the preset coverage area of the network device and by using random access preamble format information corresponding to the target sub-coverage area. In this way, a length of a random access preamble sent by a terminal device closer to the network device is shorter, and a length of a random access preamble sent by a terminal device farther away from the network device is longer, so that time-frequency resources used to transmit the random access preamble can be saved.

It should be noted that, each time before the terminal device performs step S1002, the network device does not need to correspondingly perform step S1001. This may depend on a specific application scenario.

Figure 11:
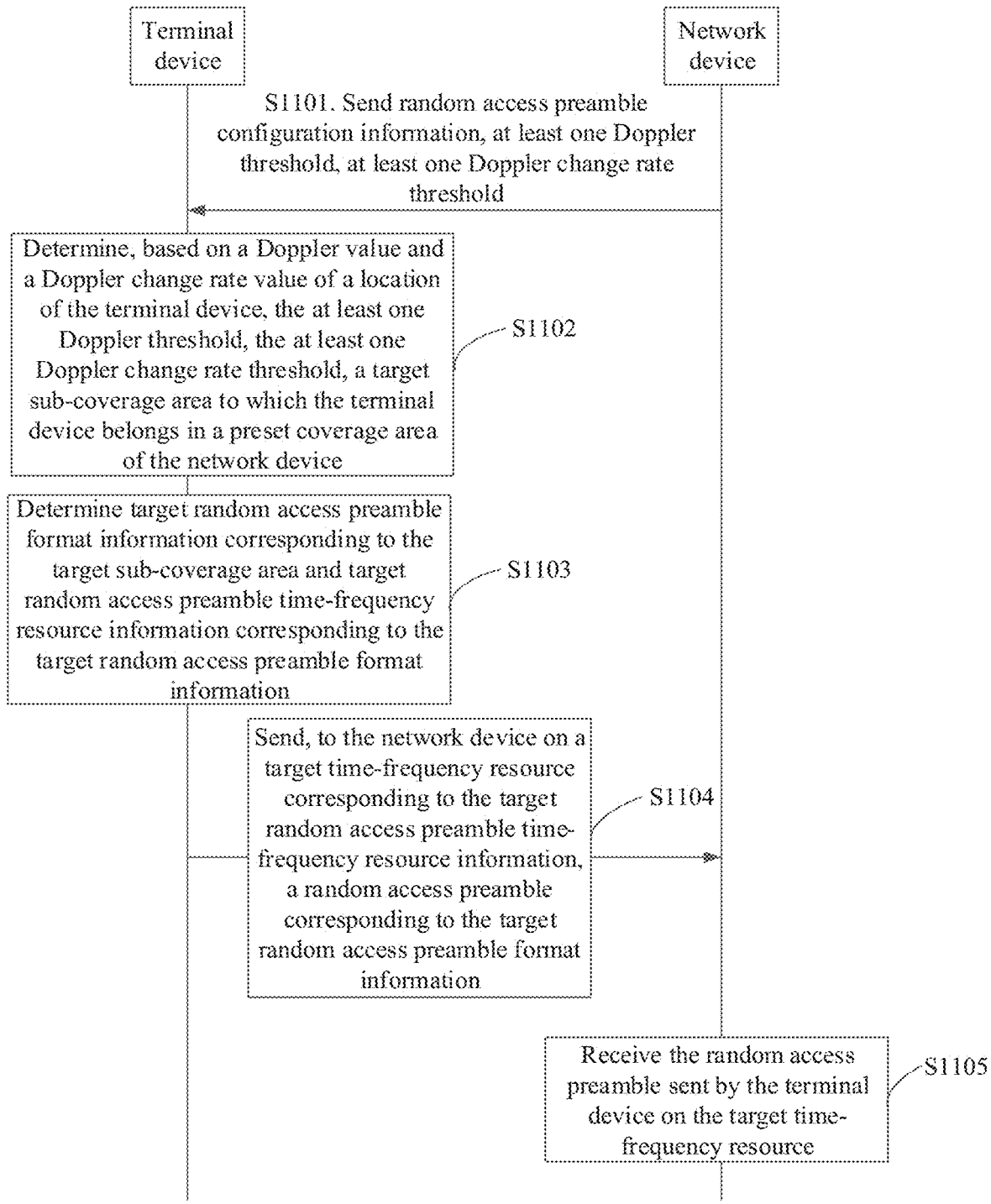
FIG. 11 is a schematic flowchart of a random access preamble transmission method according to another embodiment of this application.

FIG. 11 is a schematic flowchart of a random access preamble transmission method according to another embodiment of this application. On a basis of the foregoing embodiment, in this embodiment of this application, an implementation in which the Doppler information correspondingly includes a Doppler value and a Doppler change rate value if the Doppler reference information includes at least on Doppler threshold and at least one Doppler change rate threshold is described. As shown in FIG. 11, the method in this embodiment of this application may include the following steps.

Step S1101. A network device sends random access preamble configuration information, at least one Doppler threshold, at least one Doppler change rate threshold to a terminal device.

For example, the at least one Doppler threshold may include a Doppler threshold D1, and the at least one Doppler change rate threshold may include a Doppler change rate threshold DR1 and a Doppler change rate threshold DR2. As shown in FIG. 8, a contour line of the Doppler threshold D1, a contour line of the Doppler change rate threshold DR1, and a contour line of the Doppler change rate threshold DR2 divide a preset coverage area (an area shown by a circle in FIG. 8) of the network device into a sub-coverage area 1, a sub-coverage area 2, a sub-coverage area 3, a sub-coverage area 4, a sub-coverage area 5, and a sub-coverage area 6.

The random access preamble configuration information may include random access preamble format information corresponding to the sub-coverage area and random access preamble time-frequency resource information corresponding to each piece of random access preamble format information. For example, the random access preamble configuration information may include random access preamble format information 1 corresponding to the sub-coverage area 1, random access preamble format information 2 corresponding to the sub-coverage area 2, random access preamble format information 3 corresponding to the sub-coverage area 3, random access preamble format information 4 corresponding to the sub-coverage area 4, random access preamble format information 5 corresponding to the sub-coverage area 5, random access preamble format information 6 corresponding to the sub-coverage area 6, random access preamble time-frequency resource information 1 corresponding to the random access preamble format information 1, random access preamble time-frequency resource information 2 corresponding to the random access preamble format information 2, random access preamble time-frequency resource information 3 corresponding to the random access preamble format information 3, random access preamble time-frequency resource information 4 corresponding to the random access preamble format information 4, random access preamble time-frequency resource information 5 corresponding to the random access preamble format information 5, and random access preamble time-frequency resource information 6 corresponding to the random access preamble format information 6.

Step S1102. The terminal device determines, based on a Doppler value and a Doppler change rate value of a location of the terminal device, the at least one Doppler threshold, the at least one Doppler change rate threshold, a target sub-coverage area to which the terminal device belongs in the preset coverage area of the network device.

For example, the terminal device may determine, based on the mapping information that is among preset Doppler information, Doppler reference information, and a sub-coverage area and that is shown in the foregoing Table 3, the Doppler value D and the Doppler change rate value DR of the location of the terminal device, the Doppler change rate threshold DR1, and the Doppler change rate threshold DR2, the target sub-coverage area to which the terminal device belongs in the preset coverage area of the network device. For example, if the Doppler value D of the location of the terminal device is less than or equal to the Doppler threshold D1, and the Doppler change rate value DR is greater than the Doppler change rate threshold DR1, the terminal device may determine that the target sub-coverage area to which the terminal device belongs in the preset coverage area of the network device is the sub-coverage area 1.

Step S1103. The terminal device determines target random access preamble format information corresponding to the target sub-coverage area and target random access preamble time-frequency resource information corresponding to the target random access preamble format information.

For example, the terminal device may determine, from the random access preamble format information 1 to the random access preamble format information 6 based on the mapping information that is between a preset sub-coverage area and random access preamble format information and that is shown in the foregoing Table 3, the target random access preamble format information corresponding to the target sub-coverage area, for example, the random access preamble format information 1.

Further, the terminal device may determine the target random access preamble time-frequency resource information corresponding to the target random access preamble format information, for example, the random access preamble time-frequency resource information 1.

Step S1104. The terminal device sends, to the network device on a target time-frequency resource corresponding to the target random access preamble time-frequency resource information, a random access preamble corresponding to the target random access preamble format information.

Step S1105. The network device receives the random access preamble sent by the terminal device on the target time-frequency resource.

It should be noted that the terminal device may not need to perform the foregoing step of determining the target sub-coverage area, and may determine, based on the mapping information (for example, comparison between the Doppler information and the Doppler reference information and the corresponding random access preamble format information that are shown in the foregoing Table 3) among preset Doppler information, Doppler reference information, and random access preamble format information, the target random access preamble format information corresponding to the Doppler information of the location of the terminal device.

In conclusion, in this embodiment of this application, the network device sends the random access preamble configuration information, the at least one Doppler threshold, the at least one Doppler change rate threshold to the terminal device. The random access preamble configuration information may include but is not limited to at least two pieces of random access preamble format information and random access preamble time-frequency resource information corresponding to each piece of random access preamble format information. The at least one Doppler threshold and at least one Doppler change rate threshold are used to indicate to divide the preset coverage area of the network device into at least two sub-coverage areas. Correspondingly, the terminal device determines, based on the at least one Doppler threshold and the at least one Doppler change rate threshold, the target sub-coverage area to which the terminal device belongs in the preset coverage area of the network device, and determines, from the at least two pieces of random access preamble format information, the target random access preamble format information corresponding to the target sub-coverage area. Then, the terminal device sends, to the network device on the target time-frequency resource indicated by the target random access preamble time-frequency resource information corresponding to the target random access preamble format information, the random access preamble corresponding to the target random access preamble format information. It may be learned that, in this embodiment of this application, any terminal device may send a random access preamble based on a target sub-coverage area to which the terminal device belongs in the preset coverage area of the network device and by using random access preamble format information corresponding to the target sub-coverage area. In this way, a length of a random access preamble sent by a terminal device closer to the network device is shorter, and a length of a random access preamble sent by a terminal device farther away from the network device is longer, so that time-frequency resources used to transmit the random access preamble can be saved.

It should be noted that, each time before the terminal device performs step S1102, the network device does not need to correspondingly perform step S1101. This may depend on a specific application scenario.

Figure 12:
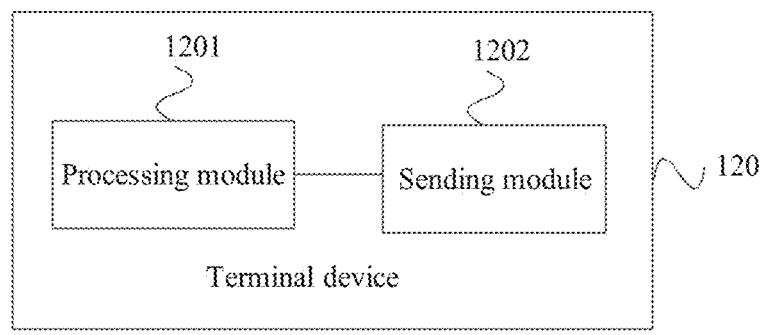
FIG. 12 is a schematic diagram of a structure of a terminal device according to an embodiment of this application.

FIG. 12 is a schematic diagram of a structure of a terminal device according to an embodiment of this application. As shown in FIG. 12, a terminal device 120 in this embodiment of this application may include a processing module 1201 and a sending module 1202.

The processing module 1201 is configured to determine, based on a target sub-coverage area to which the terminal device belongs in a preset coverage area of a network device, target random access preamble format information corresponding to the target sub-coverage area, where the preset coverage area includes one or more beams, and the preset coverage area includes at least two sub-coverage areas.

The sending module 1202 is configured to send, to the network device on a target time-frequency resource corresponding to target random access preamble time-frequency resource information, a random access preamble corresponding to the target random access preamble format information, where the target random access preamble time-frequency resource information is random access preamble time-frequency resource information corresponding to the target random access preamble format information.

In a possible implementation, the target sub-coverage area is associated with Doppler information of a location of the terminal device and obtained Doppler reference information, and the at least two sub-coverage areas are obtained through division based on the Doppler reference information.

In a possible implementation, the Doppler reference information includes: at least one Doppler threshold, where different Doppler thresholds correspond to different sub-coverage areas, and/or at least one Doppler change rate threshold, where different Doppler change rate thresholds correspond to different sub-coverage areas.

In a possible implementation, if the Doppler reference information includes at least one Doppler threshold, the Doppler information correspondingly includes a Doppler value; and/or if the Doppler reference information includes the at least one Doppler change rate threshold, the Doppler information correspondingly includes a Doppler change rate value.

In a possible implementation, the terminal device 120 further includes:

a receiving module, configured to receive the Doppler reference information sent by the network device.

In a possible implementation, the processing module 1201 is further configured to:

determine the Doppler information based on a downlink signal sent by the network device.

In a possible implementation, the processing module 1201 is specifically configured to:

determine, from obtained at least two pieces of random access preamble format information based on mapping information between a preset sub-coverage area and random access preamble format information, the target random access preamble format information corresponding to the target sub-coverage area, where the mapping information between a preset sub-coverage area and random access preamble format information includes mapping information between the target sub-coverage area and the target random access preamble format information.

In a possible implementation, the terminal device 120 further includes: the receiving module, configured to receive random access preamble configuration information sent by the network device, where the random access preamble configuration information includes the at least two pieces of random access preamble format information and random access preamble time-frequency resource information corresponding to the random access preamble format information.

In a possible implementation, random access preamble format information corresponding to different sub-coverage areas is different, and a length of a random access preamble indicated by random access preamble format information corresponding to any sub-coverage area is in a positive relationship with a distance between the sub-coverage area and the network device.

In a possible implementation, the target random access preamble format information includes at least one of the following: a length of a cyclic prefix CP, a sequence length, a quantity of repetition times of a sequence, and a subcarrier spacing of the random access preamble.

The terminal device 120 provided in this embodiment of this application may be configured to perform the technical solution related to the terminal device in the foregoing random access preamble transmission method embodiment of this application. An implementation principle and a technical effect thereof are similar. Details are not described herein again.

Figure 13:
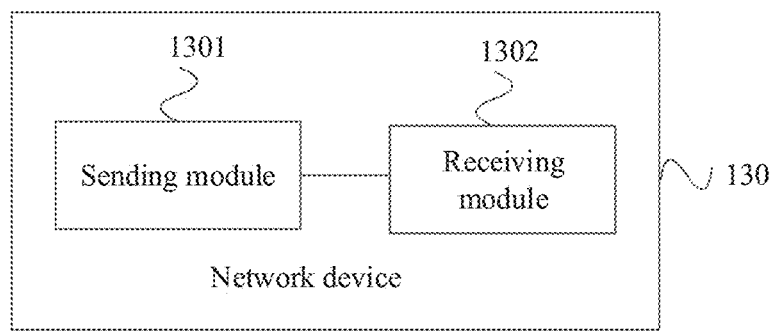
FIG. 13 is a schematic diagram of a structure of a network device according to an embodiment of this application.

FIG. 13 is a schematic diagram of a structure of a network device according to an embodiment of this application. As shown in FIG. 13, a network device 130 in this embodiment of this application may include a sending module 1301 and a receiving module 1302.

The sending module 1301 is configured to send random access preamble configuration information and Doppler reference information, where the random access preamble configuration information includes at least two pieces of random access preamble format information and random access preamble time-frequency resource information corresponding to the random access preamble format information, the Doppler reference information is used to indicate to divide a preset coverage area of the network device into at least two sub-coverage areas, and the preset coverage area includes one or more beams.

The receiving module 1302 is configured to receive a random access preamble sent by a terminal device on a target time-frequency resource, where target random access preamble format information corresponding to the random access preamble is one piece of random access preamble format information in the at least two pieces of random access preamble format information, the target random access preamble format information is associated with a target sub-coverage area to which the terminal device belongs in the at least two sub-coverage areas, and target random access preamble time-frequency resource information corresponding to the target time-frequency resource is random access preamble time-frequency resource information that corresponds to the target random access preamble format information and that is in the at least two pieces of random access preamble time-frequency resource information.

In a possible implementation, the target sub-coverage area is associated with Doppler information of a location of the terminal device and the Doppler reference information.

In a possible implementation, the Doppler reference information includes: at least one Doppler threshold, where different Doppler thresholds correspond to different sub-coverage areas, and/or at least one Doppler change rate threshold, where different Doppler change rate thresholds correspond to different sub-coverage areas.

In a possible implementation, if the Doppler reference information includes at least one Doppler threshold, the Doppler information correspondingly includes a Doppler value; and/or if the Doppler reference information includes the at least one Doppler change rate threshold, the Doppler information correspondingly includes a Doppler change rate value.

In a possible implementation, random access preamble format information corresponding to different sub-coverage areas is different, and a length of a random access preamble indicated by random access preamble format information corresponding to any sub-coverage area is in a positive relationship with a distance between the sub-coverage area and the network device.

In a possible implementation, the target random access preamble format information includes at least one of the following: a length of a cyclic prefix CP, a sequence length, a quantity of repetition times of a sequence, and a subcarrier spacing of the random access preamble.

The network device 130 provided in this embodiment of this application may be configured to perform the technical solution related to the network device in the foregoing random access preamble transmission method embodiment of this application. An implementation principle and a technical effect thereof are similar. Details are not described herein again.

Figure 14:
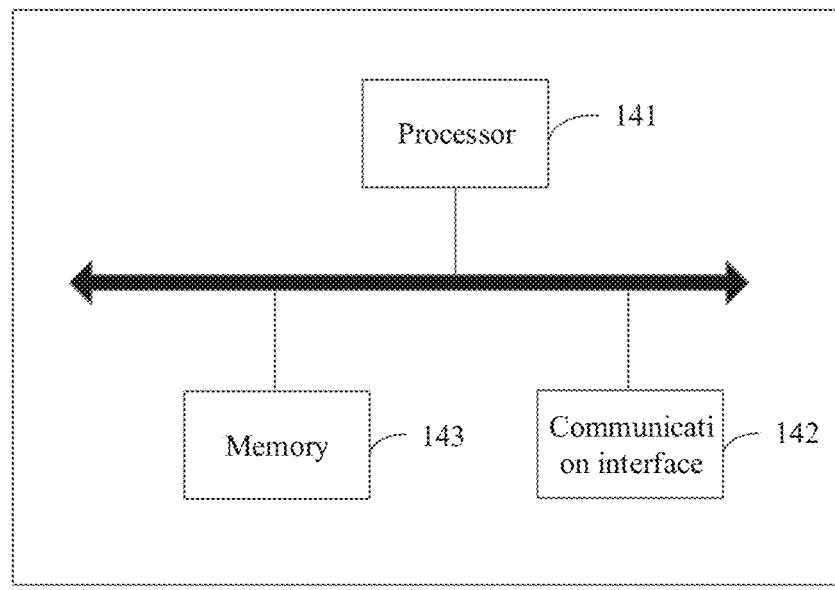
FIG. 14 is a schematic diagram of a hardware structure of a communication apparatus according to an embodiment of this application.

FIG. 14 is a schematic diagram of a hardware structure of a communication apparatus according to an embodiment of this application. Referring to FIG. 14, the communication apparatus includes a processor 141 and a communication interface 142. For example, the processor 141 and the communication interface 142 may communicate with each other by using a communication bus. The communication interface 142 is configured to: receive to-be-processed data, and output processed data. The processor is configured to perform, for the to-be-processed data, any method shown in the embodiment corresponding to FIG. 5, FIG. 9, FIG. 10, or FIG. 11. When the communication apparatus is applied to a terminal device, the to-be-processed data may be the Doppler reference information, the random access preamble configuration information, and the like in embodiments of this application, and the processed data may be the random access preamble corresponding to the target random access preamble format information and the like. When the communication apparatus is applied to a network device, the to-be-processed data may be the random access preamble sent by the terminal device on the target time-frequency resource and the like, and the processed data may be the random access preamble configuration information, the Doppler reference information, and the like.

Optionally, the communication interface 142 may further include a transmitter and/or a receiver.

Optionally, the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor or the like. The steps of the method disclosed with reference to embodiments of this application may be directly performed by a hardware processor, or may be performed by using a combination of hardware in the processor and a software module.

Optionally, the communication apparatus further includes a memory 143, configured to store program instructions. When the program instructions are executed by the processor, the method shown in the embodiment shown in FIG. 5, FIG. 9, FIG. 10, or FIG. 11 is performed. The memory and the processor may be independent units, or may be integrated together. This is not specifically limited in this embodiment of this application.

Figure 15:
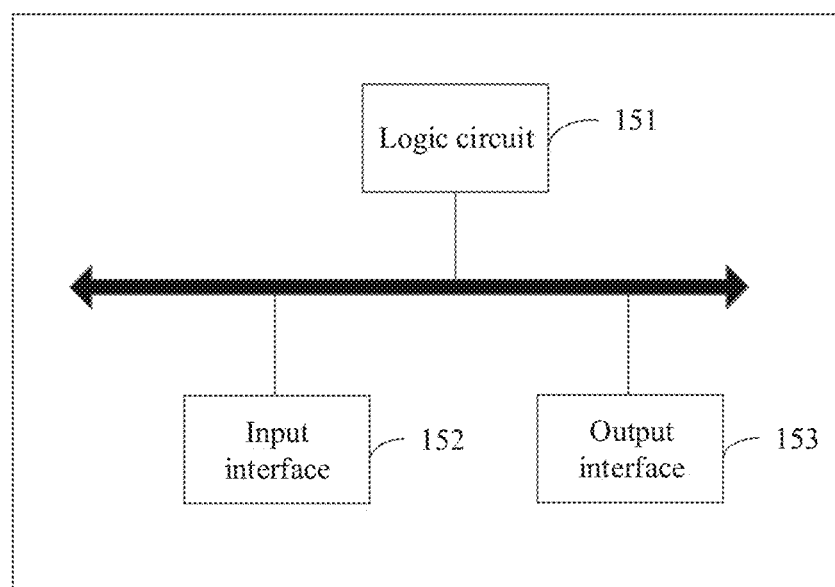
FIG. 15 is a schematic diagram of a hardware structure of a communication apparatus according to another embodiment of this application.

FIG. 15 is a schematic diagram of a hardware structure of a communication apparatus according to another embodiment of this application. Referring to FIG. 15, the communication apparatus includes a logic circuit 151, an input interface 152, and an output interface 153. The input interface is configured to obtain to-be-processed data. The logic circuit is configured to perform, for the to-be-processed data, the method shown in the embodiment shown in FIG. 5, FIG. 9, FIG. 10, or FIG. 11, to obtain processed data. The output interface is configured to output the processed data. When the communication apparatus is applied to a terminal device, the to-be-processed data may be the Doppler reference information, the random access preamble configuration information, and the like in embodiments of this application, and the processed data may be the random access preamble corresponding to the target random access preamble format information and the like. When the communication apparatus is applied to a network device, the to-be-processed data may be the random access preamble sent by the terminal device on the target time-frequency resource and the like, and the processed data may be the random access preamble configuration information, the Doppler reference information, and the like.

An embodiment of this application further provides a chip. The chip includes any one of the foregoing communication apparatuses, or is configured to support the communication apparatus in implementing the function shown in embodiments of this application. For example, a network device sends random access preamble configuration information and Doppler reference information to a terminal device. The random access preamble configuration information may include but is not limited to at least two pieces of random access preamble format information and random access preamble time-frequency resource information corresponding to each piece of random access preamble format information. The Doppler reference information is used to indicate to divide a preset coverage area of the network device into at least two sub-coverage areas. Correspondingly, the terminal device determines, based on the Doppler reference information, a target sub-coverage area to which the terminal device belongs in the preset coverage area of the network device, and determines, from the at least two pieces of random access preamble format information, target random access preamble format information corresponding to the target sub-coverage area. Then, the terminal device sends, to the network device on a target time-frequency resource indicated by target random access preamble time-frequency resource information corresponding to the target random access preamble format information, a random access preamble corresponding to the target random access preamble format information. The chip may be specifically used in a chip system. The chip system may include a chip, or may include a chip and another discrete component. When the foregoing methods are implemented by using a chip in the terminal device, the chip includes a processing unit. Further, the chip may further include a communication unit. The processing unit may be, for example, a processor. When the chip includes the communication unit, the communication unit may be, for example, an input/output interface, a pin, or a circuit. The processing unit performs all or some of actions performed by each processing module in embodiments of this application, and the communication unit may perform a corresponding receiving or sending action, for example, receive random access preamble configuration information and Doppler reference information that are sent by the network device.

An embodiment of this application provides a computer-readable storage medium. The computer-readable storage medium is configured to store a computer program, and the computer program is used to implement the method shown in the embodiment shown in FIG. 5, FIG. 9, FIG. 10, or FIG. 11.

An embodiment of this application further provides a communication system, including the terminal device shown in FIG. 12 and the network device shown in FIG. 13.

Persons of ordinary skill in the art may understand that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

In the several embodiments provided in this application, it should be understood that the disclosed apparatus and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other similar forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of hardware combined with a software function unit.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or the processor of any other programmable data processing device generate an apparatus for implementing a specific function in one or more processes in the flowcharts and/or in one or more blocks in the block diagrams.

These computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

These computer program instructions may alternatively be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more procedures in the flowcharts and/or in one or more blocks in the block diagrams.

What is claimed is:

1. A random access preamble transmission method, comprising:
   receiving, by a terminal device, random access preamble configuration information and Doppler reference information, wherein the random access preamble configuration information comprises at least two pieces of random access preamble format information and random access preamble time-frequency resource information corresponding to the random access preamble format information, the Doppler reference information indicates to divide a preset coverage area of a network device into at least two sub-coverage areas, and the preset coverage area comprises one or more beams;
   determining, by the terminal device based on a target sub-coverage area to which the terminal device belongs in the preset coverage area of the network device, target random access preamble format information corresponding to the target sub-coverage area, wherein the preset coverage area comprises one or more beams, and the preset coverage area comprises at least two sub-coverage areas; and
   sending, by the terminal device to the network device on a target time-frequency resource corresponding to target random access preamble time-frequency resource information, a random access preamble corresponding to the target random access preamble format information.

2. The method according to claim 1, wherein the target sub-coverage area is associated with Doppler information of a location of the terminal device and the Doppler reference information, and the at least two sub-coverage areas are obtained through division of the preset coverage area based on the Doppler reference information.

3. The method according to claim 2, wherein the Doppler reference information comprises at least one of:
   at least one Doppler threshold corresponding to at least one sub-coverage area; or
   at least one Doppler change rate threshold corresponding to at least one sub-coverage area.

4. The method according to claim 3, wherein:
   if the Doppler reference information comprises the at least one Doppler threshold, the Doppler information comprises a Doppler value; or
   if the Doppler reference information comprises the at least one Doppler change rate threshold, the Doppler information comprises a Doppler change rate value.

5. The method according to claim 2, wherein before determining the target random access preamble format information corresponding to the target sub-coverage area, the method further comprises:

determining the Doppler information based on a downlink signal sent by the network device.

6. The method according to claim 1, wherein determining the target random access preamble format information corresponding to the target sub-coverage area comprises:
determining, from the at least two pieces of random access preamble format information based on mapping information between a preset sub-coverage area and random access preamble format information, the target random access preamble format information corresponding to the target sub-coverage area, wherein the mapping information between a preset sub-coverage area and random access preamble format information comprises mapping information between the target sub-coverage area and the target random access preamble format information.

7. The method according to claim 1, wherein random access preamble format information corresponding to different sub-coverage areas are different, and a length of a random access preamble indicated by random access preamble format information corresponding to any sub-coverage area is in a positive relationship with a distance between the sub-coverage area and the network device.

8. The method according to claim 1, wherein the target random access preamble format information comprises at least one of a length of a cyclic prefix (CP), a sequence length, a quantity of repetition times of a sequence, or a subcarrier spacing of the random access preamble.

9. A random access preamble transmission method, comprising:
sending, by a network device to a terminal device, random access preamble configuration information and Doppler reference information, wherein the random access preamble configuration information comprises at least two pieces of random access preamble format information and random access preamble time-frequency resource information corresponding to the random access preamble format information, the Doppler reference information indicates to divide a preset coverage area of the network device into at least two sub-coverage areas, and the preset coverage area comprises one or more beams; and
receiving, by the network device, a random access preamble sent by the terminal device on a target time-frequency resource, wherein target random access preamble format information corresponding to the random access preamble is one of the at least two pieces of random access preamble format information, the target random access preamble format information is associated with a target sub-coverage area to which the terminal device belongs in the at least two sub-coverage areas, and target random access preamble time-frequency resource information corresponding to the target time-frequency resource is in the at least two pieces of random access preamble time-frequency resource information.

10. The method according to claim 9, wherein the target sub-coverage area is associated with Doppler information of a location of the terminal device and the Doppler reference information.

11. The method according to claim 10, wherein the Doppler reference information comprises at least one of:
at least one Doppler threshold corresponding to at least one sub-coverage area; or
at least one Doppler change rate threshold corresponding to at least one sub-coverage area.

12. The method according to claim 11, wherein:
if the Doppler reference information comprises the at least one Doppler threshold, the Doppler information comprises a Doppler value; or
if the Doppler reference information comprises the at least one Doppler change rate threshold, the Doppler information comprises a Doppler change rate value.

13. The method according to claim 9, wherein random access preamble format information corresponding to different sub-coverage areas are different, and a length of a random access preamble indicated by random access preamble format information corresponding to any sub-coverage area is in a positive relationship with a distance between the sub-coverage area and the network device.

14. The method according to claim 9, wherein the target random access preamble format information comprises at least one of a length of a cyclic prefix (CP), a sequence length, a quantity of repetition times of a sequence, and a subcarrier spacing of the random access preamble.

15. A communications apparatus, comprising:
at least one interface;
at least one processor, wherein the at least one interface is coupled to the at least one processor; and
one or more memories coupled to the at least one processor and storing programming instructions for execution by the at least one processor to:
receive random access preamble configuration information and Doppler reference information, wherein the random access preamble configuration information comprises at least two pieces of random access preamble format information and random access preamble time-frequency resource information corresponding to the random access preamble format information, the Doppler reference information indicates to divide a preset coverage area of a network device into at least two sub-coverage areas, and the preset coverage area comprises one or more beams;
determine, based on a target sub-coverage area to which the communications apparatus belongs in the preset coverage area of the network device, target random access preamble format information corresponding to the target sub-coverage area, wherein the preset coverage area comprises one or more beams, and the preset coverage area comprises at least two sub-coverage areas; and
send, to the network device on a target time-frequency resource corresponding to target random access preamble time-frequency resource information, a random access preamble corresponding to the target random access preamble format information.

16. The apparatus according to claim 15, wherein the target sub-coverage area is associated with Doppler information of a location of the communications apparatus and the Doppler reference information, and the at least two sub-coverage areas are obtained through division of the preset coverage area based on the Doppler reference information.

17. The apparatus according to claim 16, wherein the Doppler reference information comprises at least one of:
at least one Doppler threshold corresponding to at least one sub-coverage area; or
at least one Doppler change rate threshold corresponding to at least one sub-coverage area.

18. The apparatus according to claim 17, wherein:
if the Doppler reference information comprises the at least one Doppler threshold, the Doppler information comprises a Doppler value; or if the Doppler reference information comprises the at least one Doppler change rate threshold, the Doppler information comprises a Doppler change rate value.

\* \* \* \* \*